(12) United States Patent
Johnson et al.

(10) Patent No.: US 6,975,628 B2
(45) Date of Patent: Dec. 13, 2005

(54) METHOD FOR REPRESENTING AND CONTROLLING PACKET DATA FLOW THROUGH PACKET FORWARDING HARDWARE

(75) Inventors: Erik J. Johnson, Beaverton, OR (US); Kapil Jain, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 09/747,384

(22) Filed: Dec. 22, 2000

(65) Prior Publication Data

US 2002/0126621 A1 Sep. 12, 2002

(51) Int. Cl.[7] .......................... H04L 12/28; G06F 15/16; G06F 3/00
(52) U.S. Cl. ...................... 370/389; 370/401; 709/230; 719/331
(58) Field of Search ................................ 370/469, 389, 370/401–402, 230, 231, 235, 428; 719/331–332; 709/230–243

(56) References Cited

U.S. PATENT DOCUMENTS

| | | | | |
|---|---|---|---|---|
| 5,509,123 A | * | 4/1996 | Dobbins et al. | ............ 709/243 |
| 6,157,955 A | | 12/2000 | Narad et al. | |
| 6,526,062 B1 | * | 2/2003 | Milliken et al. | ........ 370/395.42 |
| 6,594,268 B1 | * | 7/2003 | Aukia et al. | ................. 370/400 |
| 6,675,218 B1 | * | 1/2004 | Mahler et al. | ............... 709/230 |
| 6,754,219 B1 | * | 6/2004 | Cain et al. | ................... 709/230 |
| 2002/0131364 A1 | * | 9/2002 | Virtanen et al. | |
| 2003/0227871 A1 | * | 12/2003 | Hsu et al. | |
| 2004/0032829 A1 | * | 2/2004 | Bonn | |

* cited by examiner

*Primary Examiner*—Steven Nguyen
(74) *Attorney, Agent, or Firm*—Blakely, Sokoloff, Taylor & Zafman LLP

(57) ABSTRACT

The present invention defines an object-oriented programming model appropriate for both ASIC-based networking silicon as well as network processors. This model obtains this range of expressiveness by identifying the fundamental units of packet processing performed by underlying hardware (either ASIC or network processor). Software objects, called Stages, are then created to encapsulate and represent these fundamental units of packet processing. Using this API, a directed graph of packet flow is formed using the Stage objects. This directed graph of packet flow models packet processing performed by underlying forwarding hardware. As a result, additional services can be added or deleted from a single switching/routing device without affecting the underlying forwarding engine hardware.

21 Claims, 21 Drawing Sheets

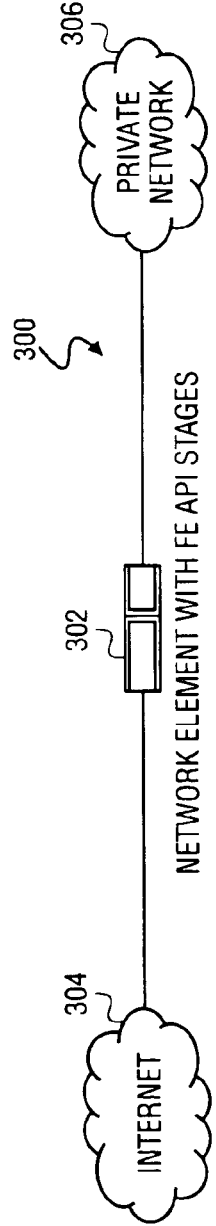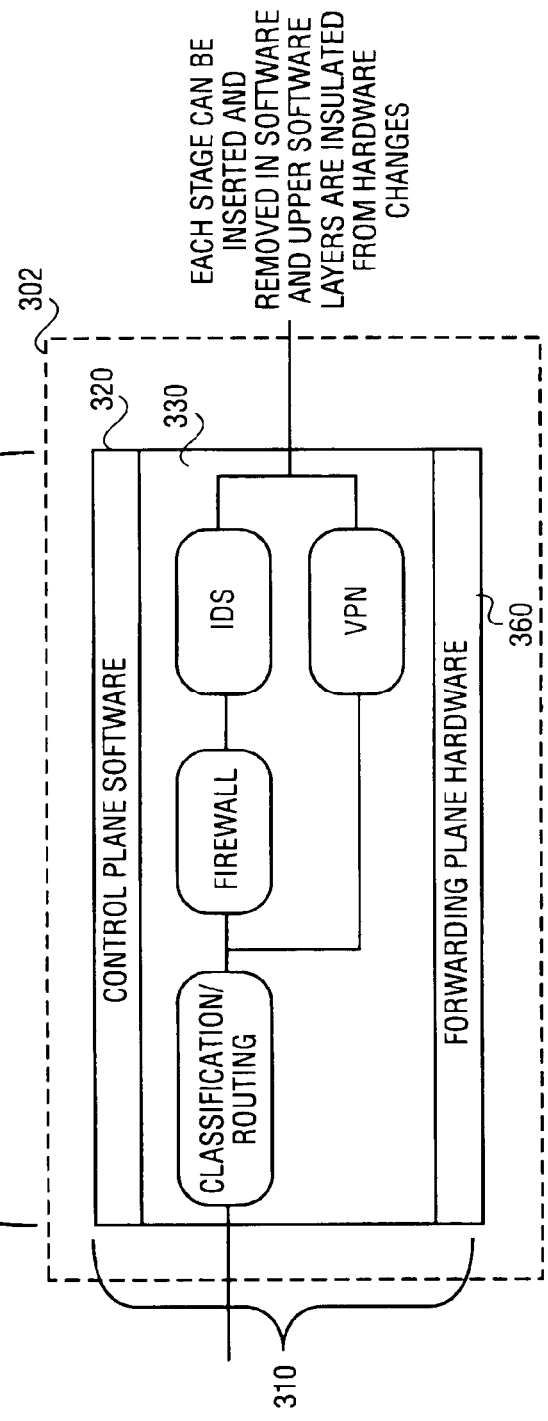

METHOD FOR REPRESENTING AND CONTROLLING PACKET DATA FLOW THROUGH PACKET FORWARDING HARDWARE

FIELD OF THE INVENTION

The present invention relates generally to packet processing performed by packet forwarding hardware. In particular, the present invention relates to a method for representing and controlling packet data flow through packet forwarding hardware.

BACKGROUND OF THE INVENTION

Today, numerous independent hardware vendors (IHV) produce networking application specific integrated circuits (ASIC) to perform a myriad of packet processing tasks. The current interface to such ASICs are generally memory mapped registers that have corresponding bit level behavior and documentation. However, not all IHVs limit their products to register level descriptions. Some offer C level or other software interfaces to the hardware, but usually, these are merely a convenient reflection of the underlying registers and therefore differ from one IHV to another. These register level models represent a steep learning curve and tight coupling for an original equipment manufacturer (OEM) or an independent software vendor (ISV) that desires to use the ASICs or networking silicon in a product. At such a micro level description (i.e., the register bits), it is difficult to write code that is reusable across these various ASICs. It is also difficult to decipher the micro level functionality of the ASICs networking silicon.

A patent issued to Narid et al. (U.S. Pat. No. 6,157,955), entitled "Packet Processing System Including A Policy Engine Having A Classification Unit," describes a general purpose, programmable packet processing platform for accelerating network infrastructure applications, which have been structured to separate the stages of classification and action. Narid et al. thus attempts to describe a software model for programming packet data flow. The application programming interface (API) described in Narid et al. defines action/classification engines (ACE) which form software objects that can be connected together to form a directed graph of data/packet flow. Packet flow, as described herein, refers to the path of a packet from its point of origination to its destination, including all intermediate nodes. However, ACEs have a high level of granularity due to the fact that each ACE contains a classification and action portion. Furthermore, the ACE directed graph is not an abstraction of data flow. Rather than providing an abstraction of underlying hardware which performs the packet processing, the ACE objects perform the packet processing at a software level. Unfortunately, performing packet processing at a software level sacrifices performance provided by performing packet processing at a hardware level.

A recent trend in the networking industry is the replacement of ASICs, which are relatively inflexible, with more programmable but still performance-oriented, network processors. Network processors are in their infancy stages and many do not have an abstract programming model, or do not have one expressive and flexible enough to grow with advances in the processor itself. In both cases, the lack of a state of the art programming model hinders both ISVs, who must write their own firmware to a moving API, and silicon vendors. ISVs and silicon vendors inevitably compete for inclusion in the designs of network devices of other network equipment companies.

Therefore, there remains a need to overcome one or more of the limitations in the above described existing art.

BRIEF DESCRIPTION OF THE DRAWINGS

The features, aspects, and advantages of the present invention will become more fully apparent from the following detailed description and appended claims when taken in conjunction with accompanying drawings in which:

FIG. 5 depicts a block diagram illustrating a computer network utilizing the teachings in accordance with a further embodiment of the present invention;

FIG. 6 depicts a block diagram of a network switching/routing device in accordance with an embodiment of the present invention;

DETAILED DESCRIPTION OF THE INVENTION

A method for representing and controlling packet data flow through packet forwarding hardware is described. In the following description, for the purposes of explanation, numerous specific details are set forth in order to provide a thorough understanding of the present invention. It will be apparent, however, to one skilled in the art that the present invention may be practiced without some of these specific details. The following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
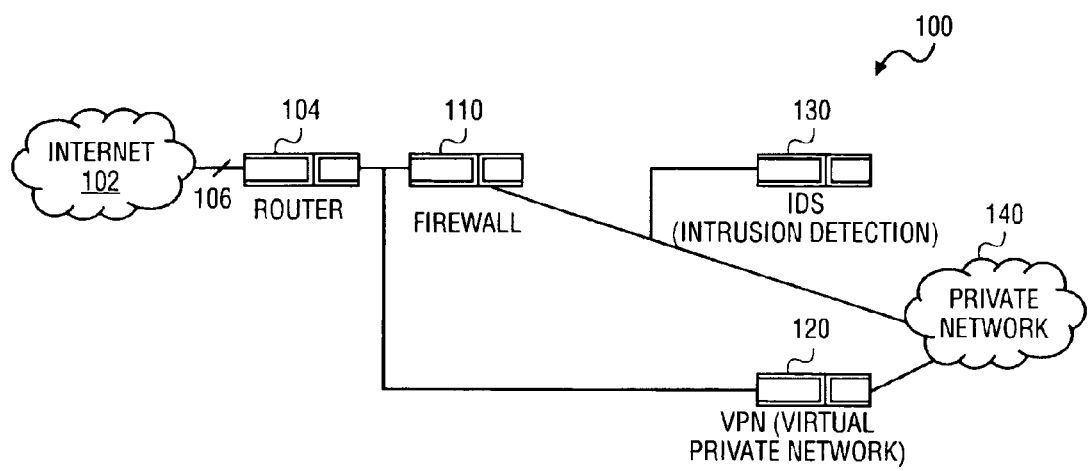
FIG. 1 depicts a block diagram illustrating a conventional network.

Referring now to FIG. 1, a block diagram of a conventional network 100 is illustrated. The conventional network 100 includes a first network switching/routing device 110. This first device 110 is, for example, a router configured as a firewall (firewall router 110). The firewall router 110 is coupled between a wide area network (Internet) 102 and a local area network (private network) 140. The conventional network 100 further includes a second network switching/ routing device 130. This second device 130 is, for example, a router configured to perform intrusion detection services (IDS router 130). The IDS router 130 is coupled with the firewall router 110. Finally, the conventional network 100 includes a third network switching/routing device 120. The third device is, for example, a router configured as a virtual private network (VPN) router 120. The VPN router 120 is coupled between an input router 104 and the private network 140. The input router 104 is coupled to the Internet 102 and routes data packets 106 to either the firewall router 110 or the VPN router 120.

As such, the conventional network provides firewall capabilities, as known to those skilled in the art, and intrusion detection capabilities, as known to those skilled in the art, using the firewall router 110 and the IDS router 130. Additionally, the conventional network 100 is configured as a virtual private network utilizing the VPN router 120. The various network switching/routing devices 110–130 are essentially fixed function ASIC devices or fixed function forwarding elements.

Figure 2:
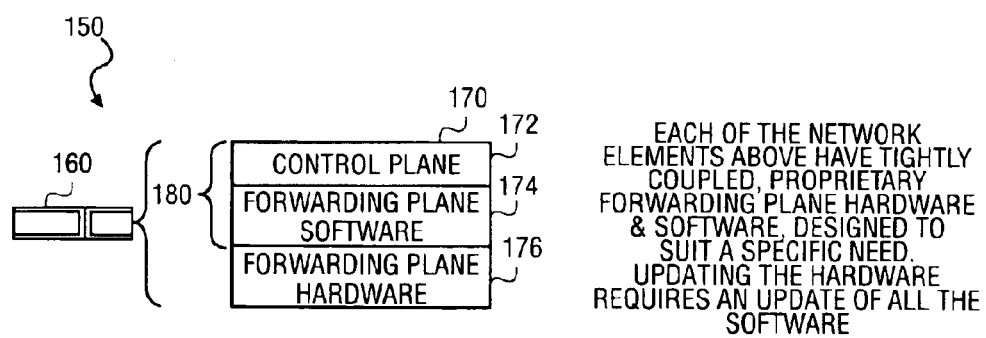
FIG. 2 depicts a conventional network switching/router device.

Referring now to FIG. 2, a block diagram 150 of the internal control processing of a network switching/routing device 160, such as for example, the network switching/ routing devices 110–130 as depicted in FIG. 1. The functionality provided by the switching/routing device 160 includes control plane processing 172 and forwarding plane processing 174 and 176. Control plane processing tasks include such tasks as routing protocols and admission controls. Forwarding plane processing includes data-path packet processing, such as classification, forwarding and manipulation. In essence, the forwarding plane provides a range of packet processing capabilities from hardware accelerated to software programmable. Packet processing includes layer 2 and layer 3 switching, packet redirection, packet filtering and packet manipulation. Unfortunately, in a fixed function switching/routing device 160, such as depicted in FIG. 2, the device is limited by tightly coupled proprietary forwarding plane hardware 176 and software 174 designed to suit a specific need. In addition, updating the hardware 176 requires an update of all of the software 174.

The present invention defines an object-oriented programming model appropriate for both ASIC-based networking silicon as well as network processors. This model obtains this range of expressiveness by identifying the fundamental units of packet processing performed by underlying hardware 176 (either ASIC or network processor). Software objects as described in further detail below, called Stages, are then created to encapsulate and represent these fundamental units of packet processing. At the first level of decomposition, specific types of stages including, for example, links, classifiers, editors, schedulers, queues, and monitors are formed. A link is a stage which represents a physical interface, including framing. A classifier stage represents a filtering or matching algorithm, while schedulers and queues can be combined to represent packet flow. On the other hand, monitor stages gather statistical information about packets and their data flows. The present invention also defines a meta stage or composition of stages such that the meta stage includes the same interface as the stage itself. This enables groups of stages to be treated as one large unit of packet processing.

Figure 3:
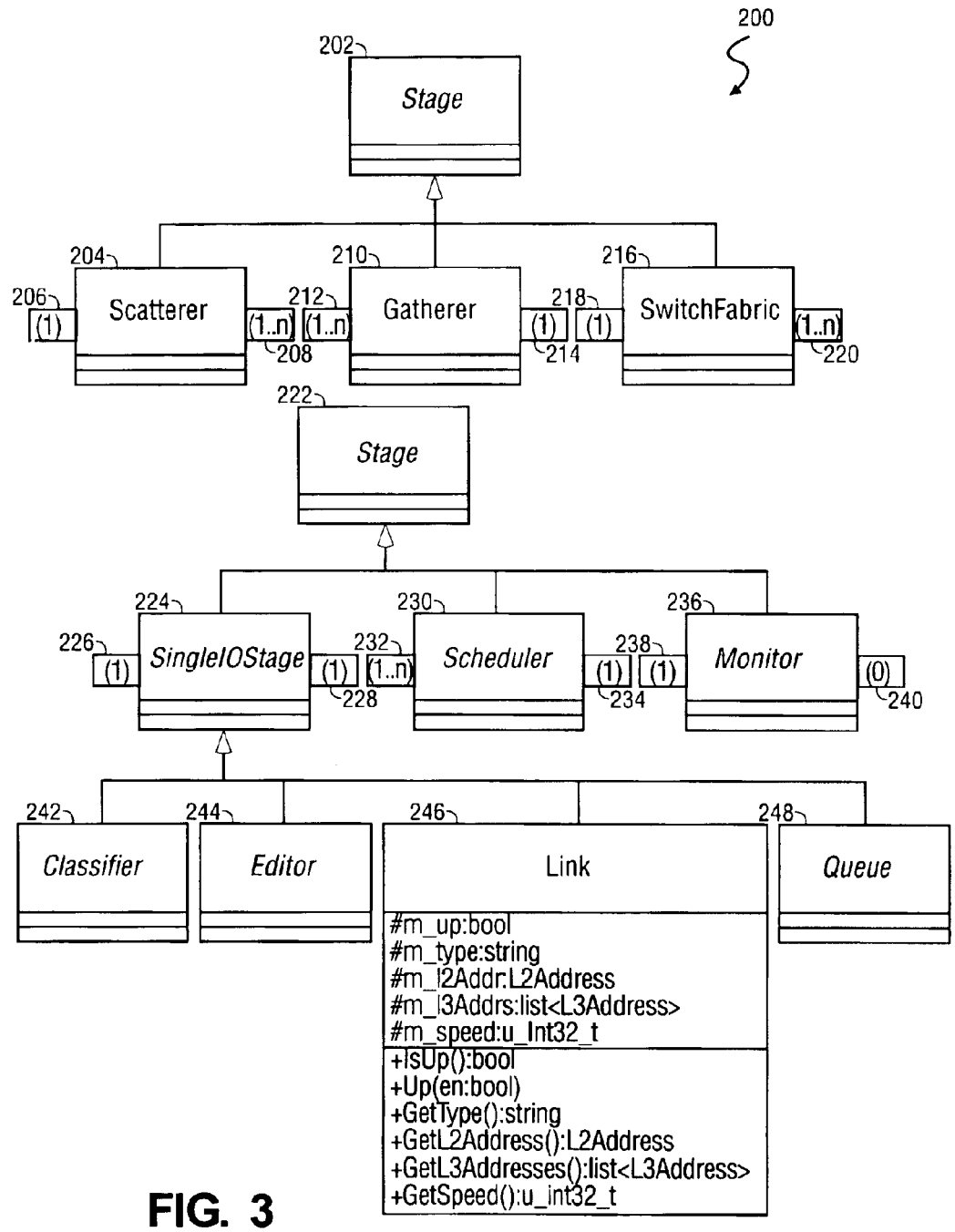
FIG. 3 depicts a class hierarchy of stage objects in accordance with an embodiment of the present invention.

Referring now to FIG. 3, a subset of a class hierarchy 200 of stages associated with the present invention is depicted. Each of the classes described above, such as scatterer 204 or gatherer 210, are types of stages. Although each stage type within the contemplation of the present invention is not illustrated in FIG. 3, this representation provides ample illustration of the various possible stage types encompassed by the present invention. Additional stage types illustrated by the present invention are described in further detail below under the application programming interface (API) description of the present invention. However, the listing of stage types in the API is not intended to provide an exhaustive list of all stage types within the contemplation of the present invention. FIG. 3 illustrates the number of inputs (to the left side of each stage type) and the number of outputs (to the right side of each stage type) for each Stage. The inputs and outputs of Stages are connected together to form a data flow topology as described in further detail below.

The API model described by the present invention provides an object-oriented abstraction of forwarding plane packet processing capabilities. These capabilities include packet classification, forwarding, queueing, and transmit scheduling which are abstracted into objects called Stages. Depending on the underlying hardware programmability, the API model can range from simply allowing a user to discover the static configuration of some Stages, to allowing arbitrary creation and interconnection of Stages. The API model provides a solution by abstracting the macro level functionality of network silicon ASICs. This enables firmware engineers to write re-useable code. More particularly, it provides a common understanding of the functionality of the silicon. In other words, the API model provides a framework in which IHVs need write only the lower layers of the API model to map from object-oriented abstractions (i.e., Stages) into their registers.

Stages have three main attributes: a set of numbered inputs, numbered outputs and named parameters. The API model enables the connection of the inputs and outputs of different Stages to form a data flow topology model of the underlying forwarding hardware. Each Stage has zero or more inputs and zero or more outputs as depicted in FIG. 3. The outputs (inputs) of one Stage are connected to inputs (outputs) of another Stage. These inputs and outputs represent both the packet data traversing the underlying forwarding engine hardware, as well as a tag. This tag is associated with the packet data and carries the interstage state. (Note, however, that the tag is not part of the packet data and is an addition to the packet data.) Some Stages pass the tag-through, some read the tag and others modify the outgoing tag. The parameters of a Stage, along with a few special (internal) synchronization objects affect the behavior of the Stage as described in further detail below. Also, the parameters of a Stage are not directly accessible, but indirectly via methods on the Stage, as synchronous modification of changes in the underlying hardware can be provided by parameters via a callback mechanism.

Figure 4:
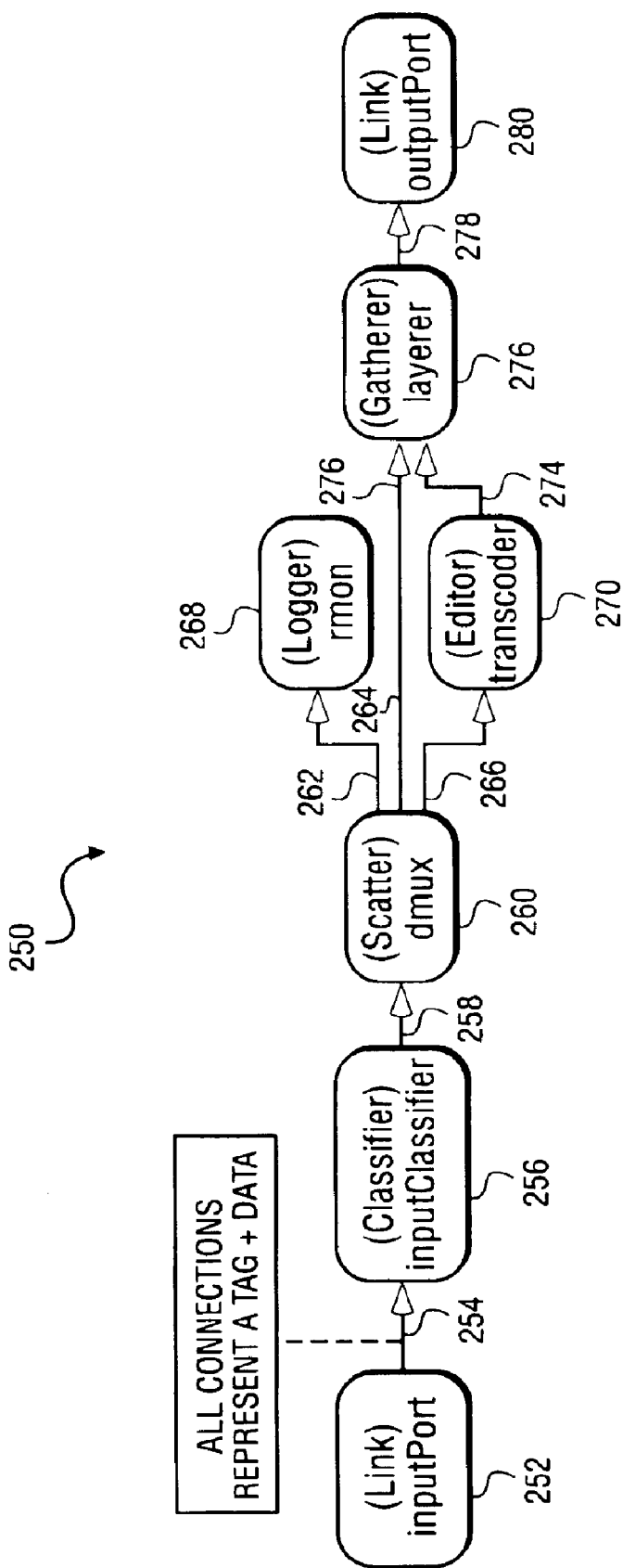
FIG. 4 depicts a block diagram illustrating a directed graph of packet flow utilizing connected stage objects in accordance with an embodiment of the present invention.

Referring now to FIG. 4, a block diagram of an interconnection of various Stages to form a data flow topology 250 of the underlying forwarding hardware is depicted. However, this data topology is provided as an example, such that those skilled in the art will appreciate that various interconnections of stage objects are within the contemplation of the present invention. The data flow topology 250 includes a link Stage as an input port 252. An output port 254 of the input port object 252 is coupled to a classifier Stage, or input classifier 256. The input classifier object 256 is coupled to a scatterer class or demux object 260. The output of the demux object is routed to either a monitor Stage 268 (RMON) or an editor Stage 270 (transcoder object). A gatherer object or gatherer Stage 276 is coupled to the demux object 260 and functions as a layerer object. Finally, a link Stage functions as an output port 280.

FIG. 4 shows the inputs and outputs of the Stages providing connections to form a data flow topology 250. Each box within the block diagram represents a Stage or functional operation performed on packet data traversing this Stage. Using such a topology provides an expressive way in describing both ordering and functionality of the underlying forwarding hardware. Note that if the above topology were abstracting an ASIC, the connections would be immutable by the programmer. Conversely, if the underlying forwarding hardware was a programmable network processor, the actual topology could be rearranged to form different types of packet processing. In either case, the above is merely a representation of how the packet processing is done by the underlying forwarding hardware. Packet data does not itself traverse the software objects in this invention. Rather, the packets still traverse the actual hardware, thus taking advantage of performance innovations in the ASICs or network processors.

Referring now to FIG. 5, a network 300 utilizing a switching/routing device 302 configured in accordance with the teachings of the present invention is depicted. This network 300 includes the routing device 302 coupled between a wide area network (Internet) 304 and a local area network (private network) 306. The network 300 depicted in FIG. 5 provides the same functionality achieved by the conventional network 100 depicted in FIG. 1. However, rather than using application-specific switching/routing devices, such as utilized in the conventional network 100, the network 300, in accordance with the present invention, utilizes a single switching/routing device to perform each of the packet processing tasks in a single box.

Referring now to FIG. 6, an internal representation of the switching/routing device 302, as depicted in FIG. 6, is illustrated. The routing device 302 includes a memory 310 containing control plane software 310, and forwarding plane software 320. The device 302 also includes forwarding plane hardware 360. The memory 310 of the router device 302 can be configured to include a compiled and linked, directed graph of packet processing Stages created using the API model object-oriented software for abstraction, as taught by the present invention. A classification/routing Stage 330 is programmed to perform input processing for the network 300. The directed graph further includes a Stage object 334 configured to perform firewall data path packet processing functionality. The directed graph 330 further includes a Stage object 336 programmed to perform intrusion detection services ID (IDS). Finally, the directed graph 330 includes a Stage object configured to perform virtual private network functionality 338.

As described above, each Stage, or software object, is designed to describe both ordering and functionality of the underlying forwarding hardware 360. The directed path 330 is merely a representation of how the packet processing is done by the forwarding hardware. The packet data does not, itself, traverse the software objects of the directed graph 330. Rather, the packets still traverse the actual hardware, thus taking advantage of the performance innovations in the ASICs, or network processors. Moreover, the various stage objects can be added or removed to add/remove functionality without affecting the underlying hardware. An API for describing directed graphs of software objects to perform data path packet processing functionality is now described.

Application Programming Interface

API Forwarding Hardware Engine Model Infrastructure

The following describes an application programming (API) interface for modeling underlying forwarding engine hardware using an object-oriented programming model that abstracts the fundamental units of packet processing performed by the hardware into software objects called stages.

Those skilled in the art will appreciate that the following API merely represents one possible implementation for such an application programming interface. As a result, changes or modifications to the following API, including various additions or deletions of software object stages or various interconnections therewith to form data flow topologies are within the scope and the contemplation of the present invention. In other words, the following API description should not be construed in a limiting sense, as this API is merely intended to provide an example of the present invention, rather than to provide an exhaustive list of all possible API implementations of the inventive techniques taught by the present invention. In the following class descriptions, some C++-like code is used. This code has been intentionally simplified for clarity. It has not been compiled, nor does it have sufficient error checking to be considered final.

Figure 7:
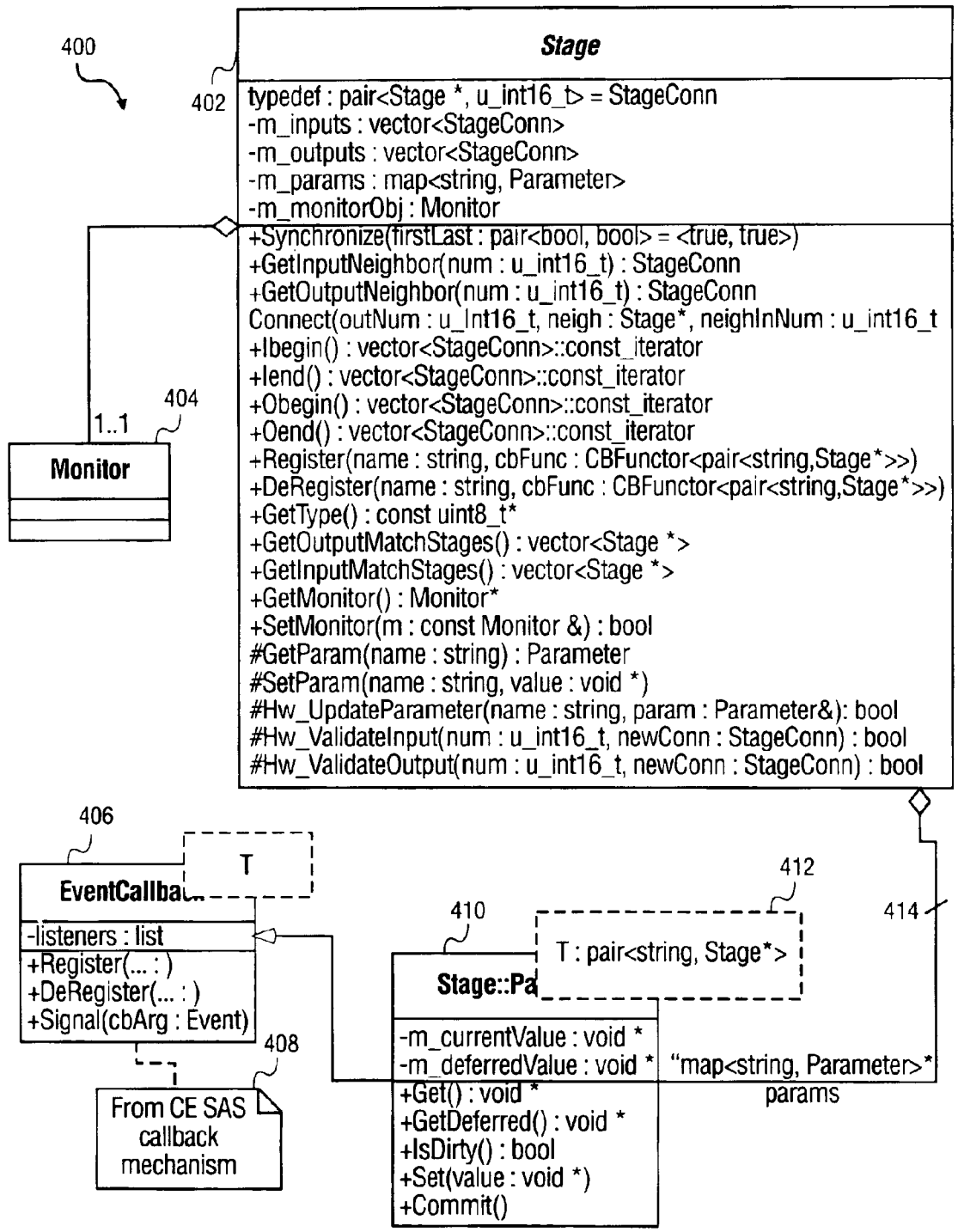
FIG. 7 depicts a block diagram illustrating stage-related classes in accordance with an embodiment of the present invention.

FIG. 7 shows the Stage-related classes 400 in the infrastructure of the API forwarding hardware engine model. The API describes a model of the underlying forwarding hardware since the API hardware engine model (engine model) provides a language for describing ordering and functionality of the underlying forwarding hardware. Packet data does not itself traverse the software objects of the present invention. There are two classes defined in FIG. 7: Stage 402, and Stage::Parameter 410. Of these, only Stage is dealt with directly by the Engine Model user. Stage::Parameter is internal to the API Model. Both are important to understanding and implementing the model.

Figure 9:
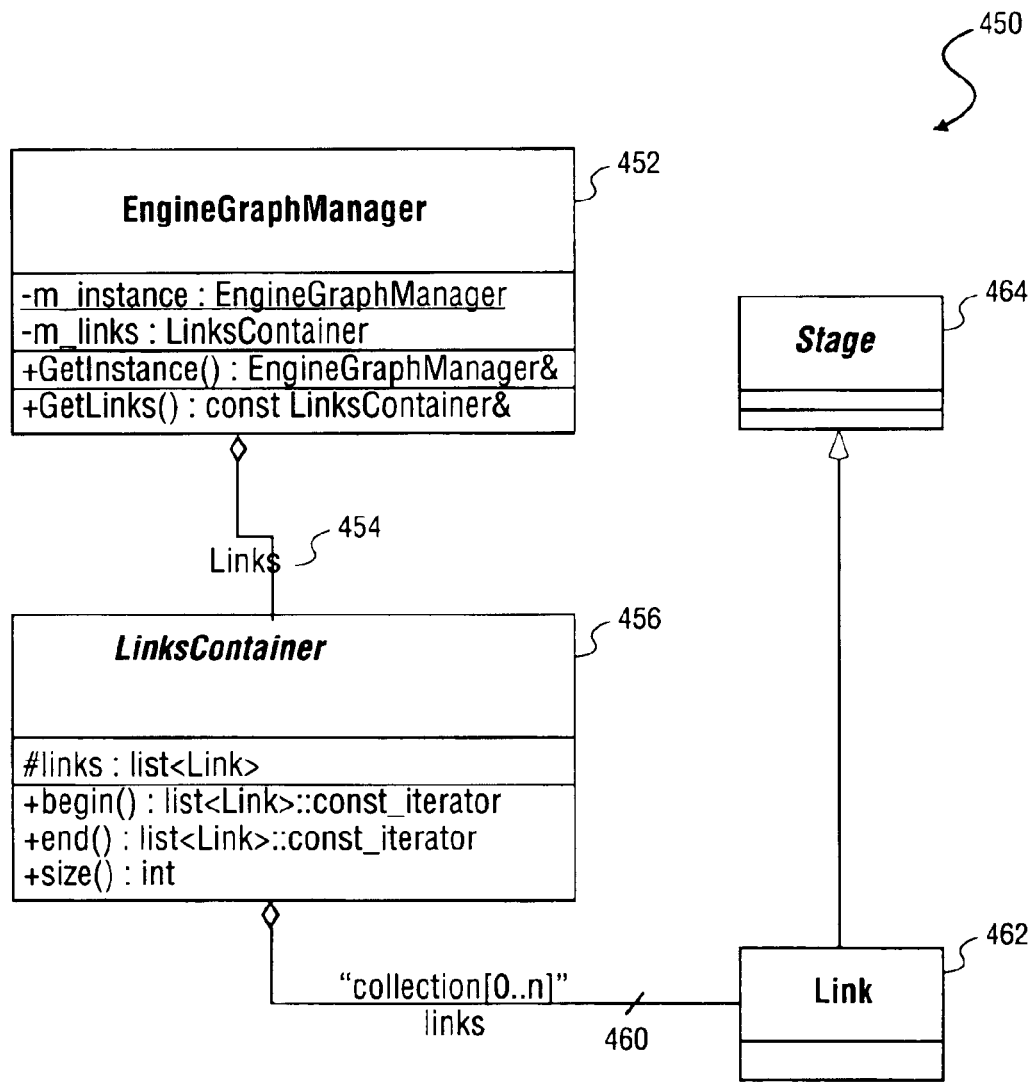
FIG. 9 depicts a block diagram illustrating an engine graph manager class in accordance with an embodiment of the present invention.

In addition to these classes, FIG. 9 shows several classes needed for inter-stage information and operations. The main class in FIG. 9 is the EngineGraphManager, which provides an entry point for discovering the capabilities and Stages of the Engine Model. Each of these classes is described in further detail below.

| Stage Class | | |
|---|---|---|
| Name: | Stage | |
| Specializes: | N/A | |
| Qualifiers: | Abstract | |

The Stage class is the central class in the Engine Model. It is the base class for virtually all other classes within this model. Its essential attributes are a set of numbered inputs, numbered outputs, and named parameters.

The inputs and outputs connect with other Stages' outputs and inputs respectively to form the topology (data flow) of the forwarding engine hardware. These inputs and outputs represent both a tag and the actual packet data. The tag represents inter-Stage state. The Engine Model programmer specifies the actual value of the tag (see Classifier, below).

Assuming the underlying forwarding hardware is not fixed function, the topology or data flow is dynamic, i.e., the Engine Model user can establish connectivity at runtime. This approach provides a more expressive, powerful model. If the underlying forwarding engine does not support such dynamic reconfiguration, the connect method can be implemented to unconditionally throw an exception.

The parameters, which are synchronized and double-buffered, provide a mechanism by which the internal behavior of a Stage is controlled. Synchronized and double-buffered is akin to a two-phase commit database transaction. See the Stage::Parameter class for more details. An external Engine Model user can register an asynchronous callback for each parameter of a Stage. Whenever the underlying forwarding engine changes the value of a parameter, the corresponding, registered callback is invoked.

Related Types:
See also Stage::Parameter
See Link (section 5.2.1), for other examples.
typedef pair<Stage *, u__int16__t> StageConn;

| Attributes | | | |
|---|---|---|---|
| Attribute | Type | Qualifiers | Description |
| m__inputs | vector<StageConn> | Private | A container of numbered inputs for this Stage. Each input holds a pointer to its neighboring Stage and the neighbor's output number. Each of these inputs represents a tag plus the data for one packet. |
| m__outputs | vector<StageConn> | Private | A container of numbered outputs for this Stage. Each output holds a pointer to its neighboring Stage and the neighbor's input number. Each of these outputs represents a tag plus the data for one packet. |
| m__params | map<string, Parameter> | Private | A container of named parameters for this Stage. Each is of type Parameter. |
| m__syncEnabled | bool | Private | True if this Stage is supposed to update the underlying hardware when Synchronize () is called. Note: This is no longer used now. |
| M__Monitor | Monitor | Private | A monitoring object |

Methods
The following methods are defined.

| Methods | Services |
|---|---|
| Synchronize | Update Stage parameters. |
| GetInputNeighbor | For a given input number, get the neighboring Stage. |
| GetOutputNeighbor | For a given output number, get the neighboring Stage. |
| Connect | Connect another Stage and its input to the output of this Stage. |
| Ibegin | Get beginning enumerator for Stage inputs. |
| Iend | Get ending enumerator for Stage inputs. |
| Obegin | Get beginning enumerator for Stage outputs. |
| Oend | Get ending enumerator for Stage outputs. |
| Register | Register a callback function for a specified parameter. |
| DeRegister | Remove a registered callback function. |
| GetType | Returns a char* indicating type of Stage |
| GetOutputMatchStages | Returns the Stages matching the filter on a particular output |
| GetInputMatchStages | Returns the Stages matching the filter on a particular input |
| GetParm | Retrieve a parameter by name. |
| SetParm | Set the value of a named parameter. |
| GetMonitor | Get the monitoring object associated with this Stage |
| SetMonitor | Set the monitoring object. |
| Hw__UpdateInput | Updates the input connection in the forwarding engine |
| Hw__UpdateOutput | Updates the output connection in the forwarding engine |

-continued

| Methods | Services |
|---|---|
| Hw_UpdateParameter | Updates the parameter in the forwarding engine |
| Hw_ValidateInput | Validates a new input connection |
| Hw_ValidateOutput | Validate a new output connection. |

Sychronize

| | |
|---|---|
| Description: | virtual void Synchronize(pair<bool, bool><br>  firstLast = pair<true, true>)<br>    throw (update_Stage_parameter_failed);<br>Updates the Stage's parameters in the actual forwarding engine. This method calls Hw_UpdateParameter ( ) for each parameter that needs updating. (IsDirty( ) returns true). The parameter commit( ) is called only if all Hw_UpdateParameter ( ) calls return true.<br>(Note: m_syncEnabled is no longer used since auto synchronization is no longer present, and there is no motivation for it now.) |
| Parameters: | IN:pair<bool, bool>    firstLast<br>        Indicates that this call to Synchronize is the first (last) in a series of related Synchronize calls. It provides a hint to the Stage about when to obtain write locks on shared data. The default value is (true, true). |
| Returns: | Nothing. |
| Exceptions: | For the first Hw_UpdateParameter ( ) that fails (i.e. returns false indicating that the hardware was not changed), an update_Stage_parameter_failed is thrown.<br>Note: Changes may need to be backed in case of failure. |

GetInputNeighbor

| | |
|---|---|
| Description: | virtual const StageConn&<br>GetInputNeighbor (u_int16_t num)<br>  throw (uint_out_of_range);<br>Retrieves the neighboring Stage and its output number for a given input. |
| Parameters: | IN: u_int16_t num    The zero-based number of the input to retrieve. |
| Returns: | Neighboring Stage output number.<br>The returned StageConn.first could be NULL, indicating that nothing is connected to the given input. |
| Exceptions: | If the given input number is not an input of the Stage, an exception is thrown. |

GetOutputNeighbor

| | |
|---|---|
| Description: | virtual const StageConn&<br>GetOutputNeighbor(u_int16_t num)<br>  throw (uint_out_of_range);<br>Retrieves the neighboring Stage and its input number for a given output. |
| Parameters: | IN: u_int16_t num    The zero-based number of the output to retrieve. |
| Returns: | Neighboring Stage input number.<br>The returned StageConn.first could be NULL, indicating that nothing is connected to the given output. |
| Exceptions: | If the given input number is not an output of the Stage, an exception is thrown. |

Connect

| | |
|---|---|
| Description: | virtual void Connect(u_int16_t outNum,<br>                    Stage *neigh, u_int16_t neighInNum)<br>                    throw (uint_out_of_range, invalid_connection);<br>Connects another Stage and its input to this Stage's output.<br>Note that Connect is called only to establish the forward connection but connections are established in both directions so that a backward connection is established from the neighbor Stage to this Stage. The given Stage * could be NULL, indicating that the output is to be disconnected. This calls Hw_UpdateInput and Hw_UpdateOutput to update the connections in hardware. |

| | | |
|---|---|---|
| Parameters: | IN: u_int16_t outNum | Number of the output to connect to the given neighbor. |
| | IN: Stage *neigh | Stage * that is to become the neighbor of the output. |
| | IN: u_int16_t neighInNum | Input number of neigh to which the output is connected. |
| Returns: | Nothing. | |
| Exceptions: | If the given output number is not an output of this Stage, an exception is thrown. | |
| | If the given input number is not an input of the neighbor, an exception is also thrown. | |
| | If the Stages can't be connected, invalid_connection is thrown. | |
| Ibegin | | |
| Description: | vector<StageConn>::const_iterator Ibegin ( ) | |
| | Enumerator for the inputs of the Stage. | |
| Parameters: | None. | |
| Returns: | Starting iterator for the inputs of the Stage. | |
| Exceptions: | None. | |
| Iend | | |
| Description: | vector<StageConn>::const_iterator Iend ( ) | |
| | Enumerator for inputs of the Stage. | |
| Parameters: | None. | |
| Returns: | Iterator pointing to the end of the inputs of the Stage | |
| Exceptions: | None. | |
| Obegin | | |
| Description: | vector<StageConn>::const_iterator Obegin ( ) | |
| | Enumerator for the outputs of the Stage. | |
| Parameters: | None. | |
| Returns: | Returns the starting iterator for the outputs of the Stage. | |
| Exceptions: | None. | |
| Oend | | |
| Description: | vector<StageConn>::const_iterator Oend ( ) | |
| | Enumerator for the outputs of the Stage. | |
| Parameters: | None. | |
| Returns: | Ending iterator for the outputs of the Stage. | |
| Exceptions: | None. | |
| Register | | |
| Description: | void Register (string name, | |
| |     CBFunctor<pair<string, Stage*>> cbFunc) | |
| |     throw (item_not_found<string>); | |
| | Registers a callback functor for changes to the named parameter. (See [CESAS]) | |
| | Whenever this parameter is modified, the named callback will be invoked. | |
| Parameters: | IN: string name | Name of a parameter. |
| | IN: CBFunctor cbFunc | Callback functor to be invoked when the named parameter is modified. |
| Returns: | Nothing. | |
| Exceptions: | If the given name does not specify a valid parameter for the Stage, item_not_found<name> is raised. | |
| DeRegister | | |
| Description: | void DeRegister(string name, | |
| |     CBFunctor<pair<string, Stage*>> cbFunc) | |
| |     throw (item_not_found<string>); | |
| | Removes a callback previously registered by RegisterCB. | |
| Parameters: | IN: string name | Name of a parameter. |
| | IN: CBFunctor cbFunc | Previously registered callback functor to be removed. |
| Returns: | Nothing. | |
| Exceptions: | If the callback cannot be deregistered item_not_found<name> is raised. | |
| GetType | | |
| Description: | virtual const uint8_t* GetType ( ) = 0; | |
| | Returns the type of the Stage. Must be implemented by specific types of Stages to return a string of the form "Stage:Class . . . " by appending to the results returned from the parent classes. eg, Ipv4Classifier returns "Stage:Classifier:IPv4Classifier". RTTI typeid(obj).name instead returns only the class name without reference to the class hierarchy. | |
| Parameters: | None | |
| Returns: | Type of Stage in char* format | |
| Exceptions: | None | |

-continued

GetOutputMatchStages

| | |
|---|---|
| Description: | vector<Stage* > GetOutputMatchStages (uint16_t output, const StageType* filter) throws (uint_out_of_range); |
| | Returns all the Stages that are of type filter reachable from the given output. As of now StageType just contalns a uint8_t* to denote the type of Stage. Note: RTTI could be used here with a template member function |
| | Eg. template<class Type> |
| |   vector<Type*> GetOutputMatches(uint16_t output, Type u) |
| | which uses dynamic cast to check if a Stage is of type u, but this requires creating unnecessary dummy objects of type u to pass in as an argument. Also having a separate filter class is more flexible, since it allows selective filtering on certain attributes of a Stage. |
| Parameters: | IN: uintl6_t output     The output port on which you want to search for a given Stage |
| | IN: const StageType *filter   The type of Stage to match. If null it returns all the Stages |
| Returns: | vector of matching Stages that can be reached from the given output. |
| Exceptions: | uint_out_of_range if output not valid |

GetInputMatchStages

| | |
|---|---|
| Description: | vector<Stage* > GetInputMatchStages(uint16_t input, const StageType* filter)throws (uint_out_of_range); |
| | Retuns the Stages that are of type filter reachable on the given input |
| Parameters: | IN: uintl6_t input     The input port on which you want to search for a given Stage |
| | IN: const StageType *filter   The type of Stage to match. If null it returns all the Stages. |
| Returns: | vector of matching Stages that can be reached from the given input |
| Exceptions: | uint_out_of_range if input not valid |

GetMonitor

| | |
|---|---|
| Description: | Monitor* GetMonitor( ) |
| | Get the monitor associated with the Stage |
| Parameters: | None. |
| Returns: | A pointer to a monitor object. This could be null to specify, no monitoring supported by this Stage. Also it could be dynamic cast to a specific type of monitor to take advantage of finer granularity/specific type of monitoring. |
| Exceptions: | None |

SetMonitor

| | |
|---|---|
| Description: | bool SetMonitor(const Monitor&) |
| | Sets the monitoring object for a Stage. |
| Parameters: | IN: Monitor& The monitor object to associate with the Stage. |
| Returns: | true if succeeds, false if not. |
| Exceptions: | None |

GetParam

| | |
|---|---|
| Description: | (protected) virtual const Parameter& |
| |         GetParam(string name) |
| |             throw (item_not_found<string>) |
| | Retrieves a parameter by name. This is used internally within the Stage. Parameters are held in a generic mechanism by the base class Stage. This enables all subclasses of Stage to have a consistent mechanism by which synchronization can be performed. In this context, a string names each parameter. These names are exclusively internal. |
| Parameters: | IN: string name     Name of the parameter to retrieve. |
| Returns: | Named parameter. |
| Exceptions: | item_not_found<string> |

SetParam

| | |
|---|---|
| Description: | (protected) virtual void SetParam(string name, void *value) |
| |    throw (item_not_found<string>); |
| | Sets the value of a named parameter. |
| | Note: this method is specifically written to prevent Stage subclasses from adding new parameters by accidentally passing an invalid name. This relies on the same exception mechanism used by GetParam. |
| Parameters: | IN: string name     Name of the parameter to have its deferred value set to value. |
| | IN: void *value     Pointer to a new deferred value for the named parameter. |

-continued

| | | |
|---|---|---|
| Returns: | Nothing. | |
| Exceptions: | item_not_found<string> | |
| Hw_UpdateParameter | | |
| | | |
| Description: | (protected) virtual bool Hw_UpdateParameter | |
| | (string name, Parameter& p) = 0; | |
| | Stage calls this routine to update a parameter in the forwarding engine (i.e. hardware). If the value could not be updated, this method should leave the hardware in the previous state and return false. | |
| | This method will contain platform-specific code for each subclass of Stage. | |
| | Note: Operations should be performed as follows: | |
| | 1. Read the deferred value of the given parameters. | |
| | 2. Transform new p into hardware-specific format. | |
| | 3. Perform an actual register poke, trap into the operating system, or driver call. | |
| Parameters: | IN: string name | Name of the parameter. |
| | IN: Parameter& p | If a parameter is to be updated, p represents a parameter that isDirty and needs updating in the hardware. |
| | Returns: Returns true if the value was updated correctly; false if not. | |
| Exceptions: | None. | |
| Hw_UpdateInput Hw_UpdateOutput | | |
| | | |
| Description: | (protected) virtual bool Hw_UpdateInput | |
| | (u_int16_t num, StageConn conn) = 0; | |
| | (protected) virtual bool Hw_UpdateOutput | |
| | (u_int16_t num, StageConn conn) = 0; | |
| | Stage calls this routine to update an input, or an output in the forwarding engine (i.e. hardware). If the value could not be updated, this method should leave the hardware in the previous state and return false. | |
| | This method will contain platform-specific code for each subclass of Stage. | |
| Parameters: | IN: u_int16_t num | Number of the input or output. |
| | IN: StageConn conn conn contains | If an input (output) is to be updated, |
| | | the neighboring Stage and its connecting output (input) number. |
| Returns: | Returns true if the value was updated correctly; false if not. | |
| Exceptions: | None | |
| Hw_ValidateInput | | |
| | | |
| Description: | (protected) virtual bool | |
| | Hw_ValidateInput(u_int16_t num, | |
| | StageConn newConn) = 0; | |
| | Called at the beginning of connect ( ) validate input connectivity. No hardware is updated during this call. | |
| Parameters: | u_int16_t num | Number of the input being |
| | connected. | |
| | StageConn newConn New connection to be validated. | |
| Returns: | Returns true if the new connection is valid (i.e., supported by the hardware). If the new value is somehow incompatible with the hardware, false is returned | |
| Exceptions: | None. | |
| Hw_ValidateOutput | | |
| | | |
| Description: | (protected) virtual bool | |
| | Hw_ValidateOutput(u_int16_t num, | |
| | StageConn newConn) =0; | |
| | Called at the beginning of connect ( ) to validate output connectivity. No hardware is updated during this call. | |
| Parameters: | u_int16_t num | Number of the output being |
| | connected. | |
| | StageConn newConn | New connection to be validated. |
| Returns: | Returns true if the new connection is valid (i.e., supported by the hardware). If the new value is somehow incompatible with the hardware, false is returned. | |
| Exceptions: | None | |

Example:
Refer to FIG. 4 to see the Stages used in this example:

```
// Connect the inputClassifer to the monitor, editor, and
// gatherer
inputClassifier->connect(0, dmux, 0);
dmux->connect(0, rmon, 0);
dmux->connect(1, layerer, 0);
dmux->connect(2, transcoder, 0);
transcoder->connect(0, layered, 1);
// Explore the Outputs of the dmux.
#define STAGE_OF(x) (x).first
#define NUM_OF(x) (x).second
vector<StageConn>::const_iterator i;
for (i = dmux->obegin( ); i != dmux->oend( ); ++i)
{
    // *i hold a pointer to the neighbor and its input number.
    Stage *neighbor = STAGE_OF(i);
    u_int16_t neighInputNum = NUM_OF(i);
    if (i == dmux->obegin( ))
    {
        assert(neighInputNum == 0); // RMON's input
        assert(neighbor == rmon);
    }
}
```

Stage::Parameter Class

| Name: | Stage::Parameter |
|---|---|
| Specializes: | EventCallback<pair<string, Stage*>> |
| Qualifiers: | protected |

Figure 8:
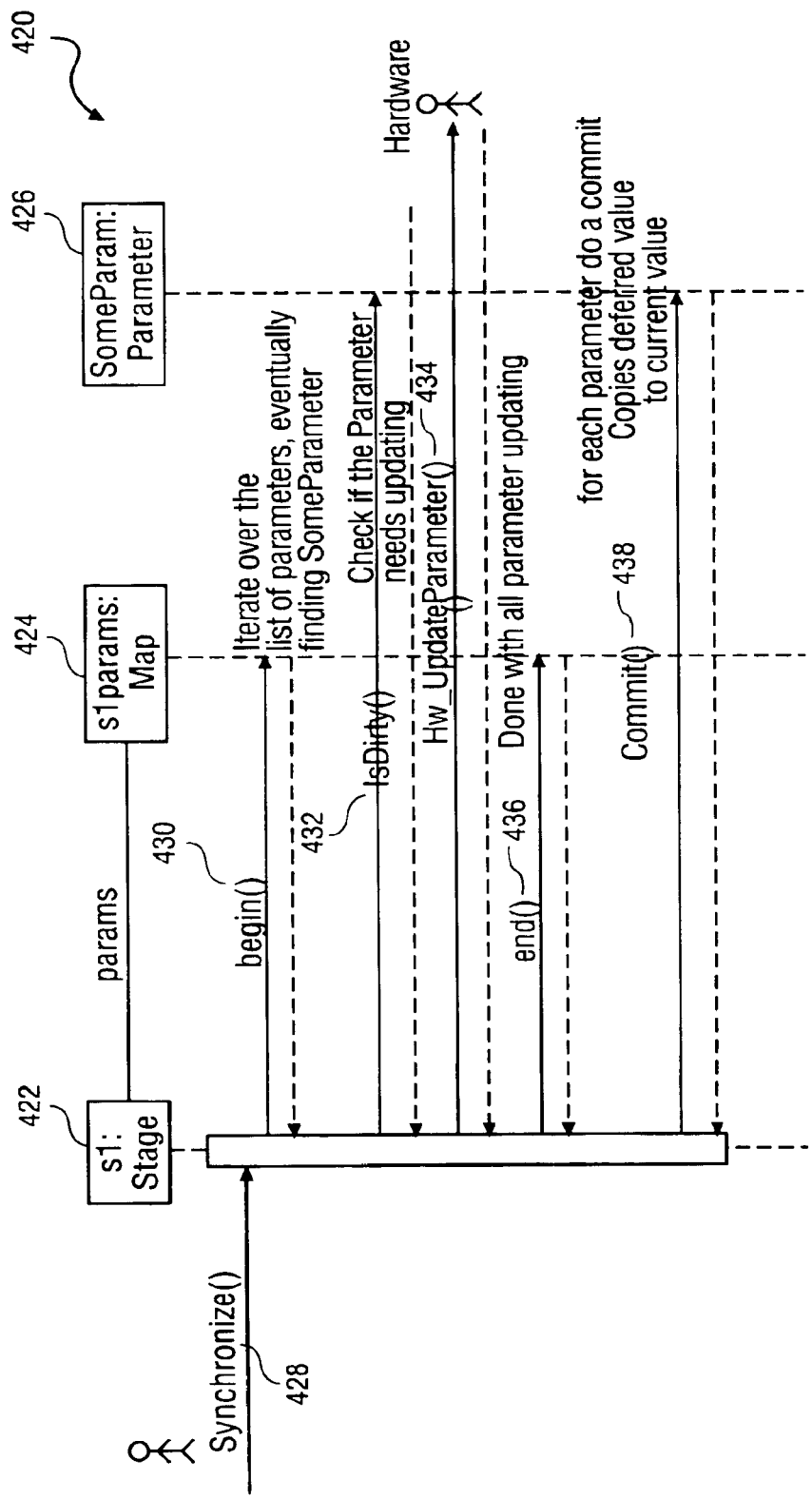
FIG. 8 depicts a diagram illustrating functional steps for updating a stage parameter subclass using a synchronized function in accordance with an embodiment of the present invention.

The Stage::Parameter class 410 represents a Stage's parameter. The motivation for this simple class is to encapsulate the notion of double buffering (or two-phase commit). As described with reference to FIG. 8, a Parameter 410 maintains a shadow of the value currently in hardware plus a deferred value that will be placed into the hardware during the owning Stage's synchronization.

Parameters can also conveniently capture the asynchronous changes in the underlying forwarding engine hardware. To enable this, every Parameter can be given a list of callbacks to invoke when the parameter changes. The actual registration mechanism is exposed through the Stage::Register and Stage::DeRegister methods.

Related Types:
See Stage

| Attributes | | | |
|---|---|---|---|
| Name | Type | Qualifiers | Description |
| m_currentValue | Void | * Protected | The current value of this parameter (a shadow of the hardware). |
| m_deferredValue | Void | * Protected | The next, or new, value of the parameter that will be placed into hardware during the next Stage synchronization. |

Methods
The following methods are defined.

| Methods | Services |
|---|---|
| Get | Get current value. |
| GetDeferred | Get the deferred value. |
| IsDirty | Test for value reset. |
| Set | Set deferredValue. |
| Commit | Copy deferredValue to currentValue. |

Get

| Description: | const void *Get () const;<br>Retrieves the current value (a shadow of the value currently in the hardware). |
|---|---|
| Parameters: | None. |
| Returns: | Current value. |
| Exceptions: | None. |

GetDeferred

| Description: | const void *GetDeferred () const;<br>Retrieves the future value, which could be NULL. |
|---|---|
| Parameters: | None. |
| Returns: | Deferred value. |
| Exceptions: | None. |

IsDirty

| Description: | bool IsDirty () ;<br>Discover if the deferred value has been set since the last Commit (). |
|---|---|
| Parameters: | None. |
| Returns: | True if deferred value has been set; false if not. |
| Exceptions: | None. |

Set

| Description: | void Set (void *value) ;<br>Sets the deferred (or new, or next) value of this parameter. |
|---|---|

-continued

After this method returns, IsDirty ()
will be true until the next invocation of Commit ().

| Parameters: | IN: void *value | A void pointer which will become the deferred value of the parameter. The Parameter is not responsible for memory management of the pointer. |
| --- | --- | --- |
| Returns: | Nothing. | |
| Exceptions: | None. | |

Commit

| Description: | void Commit () ;<br>If the parameter IsDirty, commit copies the deferredValue to the currentValue and obsoletes the deferredValue. In addition, all registered callbacks are signaled to indicate a change to the underlying hardware.<br>Because of this, all implementers of Stage subclasses must call Commit after they have updated a Paramater's value. Stage::Synchronize calls Commit after the parameter has been updated. After Commit is called, IsDirty is false until the next invocation of Set. |
| --- | --- |
| Parameters: | None. |
| Returns: | Nothing. |
| Exceptions: | None. |

EngineGraphManager Class

| Name: | EngineGraphManager |
| --- | --- |
| Specializes: | N/A |
| Qualifiers: | N/A |

The EngineGraphManager 452, as depicted with reference to FIG. 9, is a singleton class. The one instance of this class is used to gather global information (such as available Stages, constraints on interconnecting Stages, and intra-Stage parameter updating). Currently the EngineGraphManager 452 provides a mechanism to retrieve all of the terminal Stages (i.e., Links 462) in the Engine Model. The Engine Model can then be traversed to find information on all the connected Stages.

The EngineGraphManager 452 exposes the possible interconnections of the Stages. Each Stage also holds an attribute optional which is true if the Stage can be bypassed. Intra-Stage parameter updating constraints are taken care of by providing read only attributes (i.e. only Get methods) for the corresponding parameters (e.g., in FIG. 4, if the classifier was optional, the output of the link could be directly connected to the scatterer). On the other hand, the editor being optional is implicit in the way we have a scatterer/gatherer, which by means of parameter setting can bypass the editor. We could make the parameter read-only if that wasn't desired. If the model was completely flexible and programmable then the topology could be connected in anyway without connect throwing an exception.

The other way, is to have an mutable attribute for any connection. This has the advantage that a meta-Stage (composite Stage) defined at runtime, can be installed and removed as desired. (This can be done using the isoptional attribute in Stage too, but then that meta-Stage has to be defined at compile-time). In this case to represent an optional Stage we would have to make the outconnection of previous Stage and inconnection of the following Stage as mutable Note: The capabilities of an FE related to links are in the Link class, other capabilities such as the ability to do certain types of filtering etc, can in some sense be represented in the interconnection of Stages. In order to represent a specific type we will use that Stage eg. Five Tuple Classifier in the interconnected model whereas to represent a general type of classification we will use Classifier Stage in the model, and the FEAPI model user can then model that Stage to be the specific type of classifier it wants.

Related Types:

See also LinksContainer.

Attributes

| Name | Type | Qualifiers | Description |
| --- | --- | --- | --- |
| m_instance | EngineGraphManager | Static private | The single instance of this class. |
| m_links | LinksContainer | Private | The list of input output Links within this instance of the Engine Model. |

Methods

The following methods are defined.

| Methods | Services |
| --- | --- |
| GetInstance | Get the single instance of this class. |
| GetLinks | Get set of Links that represent inputs/outputs to the engine model. |

GetInstance

| Description: | static EngineGraphManager& GetInstance( );<br>Gets the single instance of this class. |
| --- | --- |

-continued

| | |
|---|---|
| Parameters: | None. |
| Returns: | Returns the single instance of this class. |
| Exceptions: | None. |

GetInputLinks

| | |
|---|---|
| Description: | const LinksContainer& GetLinks( );<br>Gets the set of links that represent inputs/outputs within this instance of the Engine Model. |
| Parameters: | None. |
| Returns: | Returns the Links. |
| Exceptions: | None. |
| Example: | |

```
// Get the single instance of the EngineGraphManager
// and find out how many input and output links there
// are in this instance of the model
// Assumption: 1. A link is both an input and output link
// 2. A link will always be either at beginning or end of packet flow.
// If these assumptions do not hold true then we may need sets of input
//and output links as before.
EngineGraphManager& egm = EngineGraphManager::GetInstance( );
const LinksContainer& links = egm.GetLinks( );
cout << "There are" << links.size( );
cout << "ports on this FE" << endl;
// Obviously each Link is a Stage, so you can also use
// the iterators to traverse the data flow network
void depthFirstTraversal (Stage *s)
{
    cout << "At Stage" << s << endl;
    vector<StageConn>::const_iterator i;
    u_int16_t outNum = 0;
    // For each output of the given Stage, traverse it
    for (i = s->Obegin( ); i != s->Oend( ); ++i, ++outNum)
    {
        // Find the neighbor and if it is not a link recurse
        Stage *neigh = STAGE_OF(i);
        if (!(neigh instanceof Link)) // dynamic cast in C++
        {
            // the same Stage could be encountered in multiple paths
            // because of gatherer and scatteror, and hence
            // have a check to make sure this is enountered for first time
            // can skip if not
            cout << "Output "<< outNum;
            cout << " is hooked to" << neigh <<
            cout << " input << NUN_OF(i) << endl;
            depthFirstTraversal (neigh);
        }
    }
    cout << "Leaving Stage " << s << endl;
}
// For each input link, walk through the data path
for (i = links.begin( ); i != links.end( ); ++i)
    depthFirstTraversal (&(*i));
```

| LinksContainer Class | | |
|---|---|---|
| Name: | | LinksContainer |
| Specializes: | N/A | |
| Qualifiers: | N/A | |

This class holds a list of the Links (terminal Stages) in the data-flow topology. The class provides access to an immutable iterator over these Links.

Related Types:

See also EngineGraphManager.

Attributes

| Attributes | | | |
|---|---|---|---|
| Name | Type | Qualifiers | Description |
| m_links | list<Link> | Protected | List of Links. |

Methods

The following methods are defined.

| Methods | Services |
|---|---|
| begin | Get the beginning iterator for the list of Links. |
| end | Get the ending iterator for the list of Links. |
| size | Get the number of Links in the list. | begin

| | |
|---|---|
| Description: | list<Link>::const_iterator begin( ); |
| Parameters: | None. |
| Returns: | Returns the beginning iterator for the list of Links. |
| Exceptions: | None. | end

| | |
|---|---|
| Description: | list<Link>::const_iterator end( ); |
| Parameters: | None. |
| Returns: | Returns the ending iterator for the list of Links. |
| Exceptions: | None. | size

| | |
|---|---|
| Description: | int size( ); |
| Parameters: | None. |
| Returns: | Returns the number of Links in the list. |
| Exceptions: | None. |

Example:

See EngineGraphManager.

Stage Types

Specific types of Stages are defined in this section. These build off the infrastructure direct graph of packet flow 250 depicted in FIG. 4. For each new type of Stage the number of inputs and outputs is specified. The parameters (or adjustments) of the particular Stage are described in terms of operations on the Stage.

Figure 10:
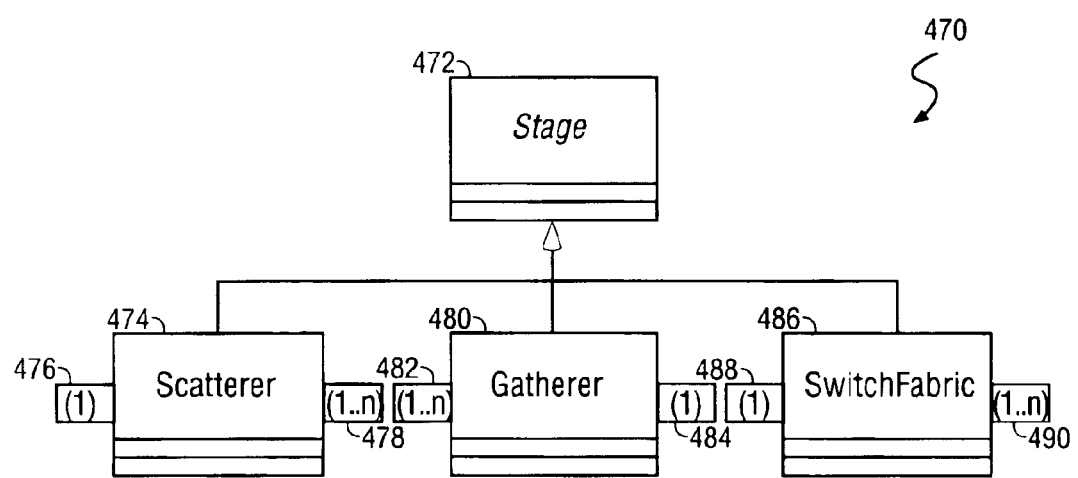
FIG. 10 depicts a block diagram illustrating multiplexing and demultiplexing stage types in accordance with a further embodiment of the present invention.
Figure 11:
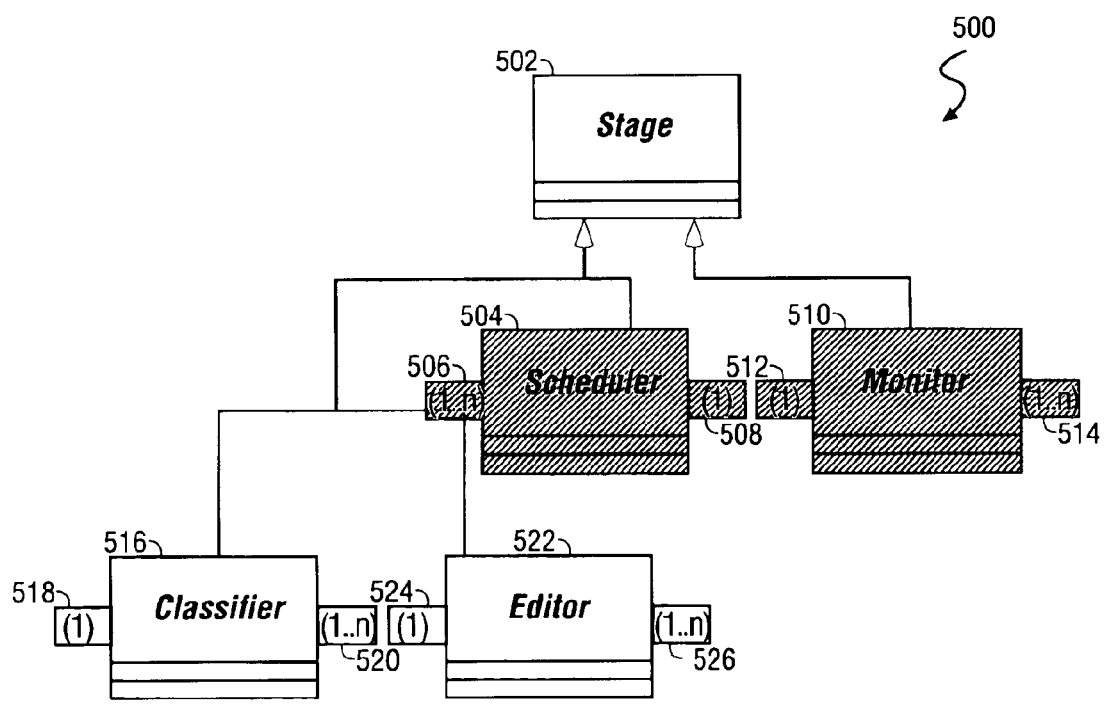
FIG. 11 is a block diagram illustrating top level stage types in accordance with a further embodiment of the present invention.

FIG. 10 shows the multiplexing and demultiplexing Stage types. FIG. 11 shows some of the remaining first layer of specific Stage types defined in the Engine Model. Each Stage type is a subclass of the Stage class. In the following sections, each of these Stage types is described along with its subclasses.

Multiplexing and Demultiplexing Types
Scatterer Class

| Name: | Scatterer |
|---|---|
| Specializes: | Stage |
| Qualifiers: | N/A |

Figure 12:
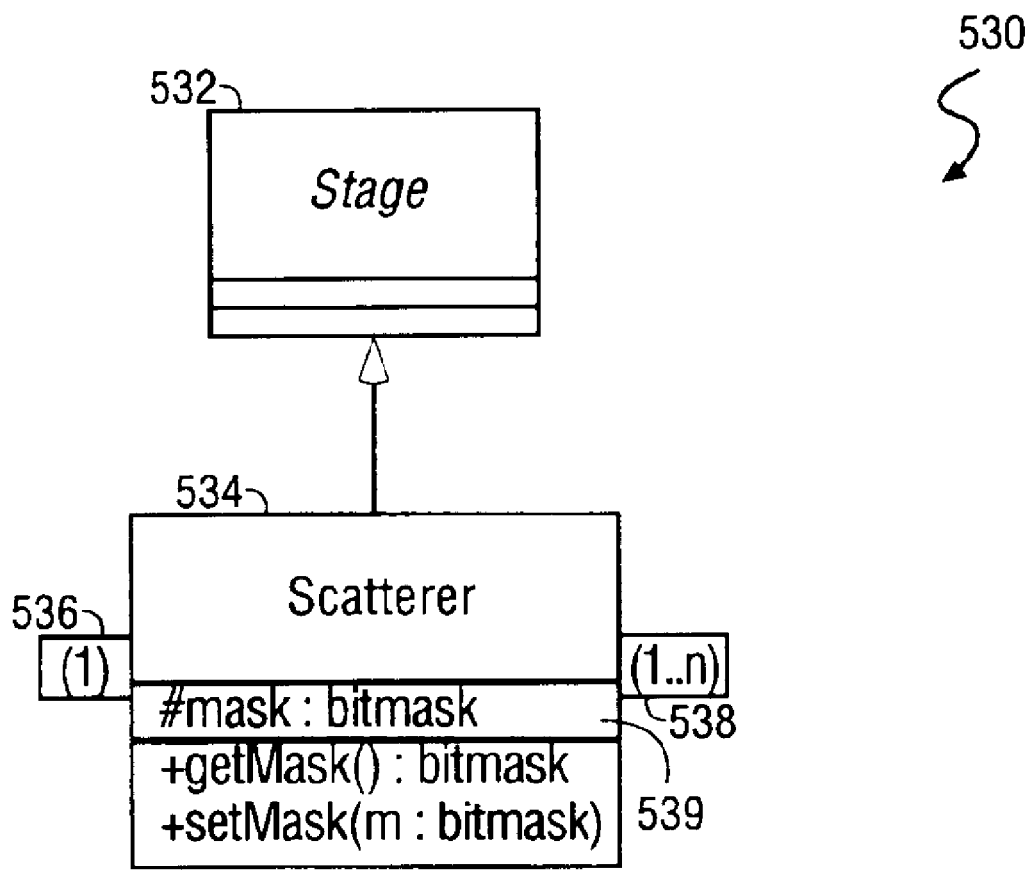
FIG. 12 depicts a scatterer class object in accordance with an embodiment of the present invention.

A scatterer 534, as depicted in FIGS. 10 and 12, is a subclass of Stage 532 has one input 536, multiple outputs 538 (538-1, . . . , 538-N), and operates much like a demultiplexor. A Scatterer Stage 534 copies any data on its data input 536 to all of its enabled outputs 538. A mask-instance variable 539 controls which outputs 538 are considered enabled. There are two main uses of this class:

A Scatterer can represent a simple user-controlled N-way switch. Setting one bit in the mask to 1 achieves this functionality. This might be used to insert or remove a coprocessor from the data path of the forwarding engine hardware.

A Scatterer can also represent a bus or replicator. Setting multiple bits in the mask to 1 achieves this functionality. This might be used when data within the forwarding engine is sent in parallel to two or more Stages. The Scatterer in FIG. 4 illustrates this use.

Note: As stated in the introduction, no data actually passes through the Scatterer object, which is merely a representation of the underlying hardware.

Combinations of the above functionality are also possible. However, a Scatterer does not model per-packet demultiplexing. See SwitchFabric for such functionality.

This class is essential to representing many of the parallel operations of the underlying forwarding-engine hardware. For example, it would allow a coprocessor to be switched on and off, or a remote monitoring agent to gather statistics in parallel with standard forwarding Stages.

Related Types:

See also Gatherer

Stage Parameters

| Parameter | Type | Description |
|---|---|---|
| mask | bitmask | The mask controls where incoming packets are copied. |

Methods
The following methods are defined.

| Methods | Services |
|---|---|
| GetMask | Get the current mask value. |
| SetMask | Set the deferred mask value. |

GetMask

| Description: | bitmask GetMask() const; |
|---|---|
| Parameters: | None. |
| Returns: | Current value of the mask. |
| Exceptions: | None. |

SetMask

| Description: | void SetMask (bitmask m); |
| | Sets the deferred value of the mask |
| Parameters: | IN: bitmask m    The new bitmask to use to determine what outputs are enabled. Takes effect after the next Synchronize(). |
| Returns: | Nothing. |
| Exceptions: | None. |

Example:

```
// The dmux object would be created as follows:
Scatterer *dmux = new Scatterer(3); // 3 = # Outputs
// The Scatterer would be connected to the other Stages
// as in the example from the Stage class.
inputClassifier->Connect(0, dmux, 0);
dmux->Connect(0, rmon, 0);
dmux->Connect(1, layerer, 0);
dmux->Connect(2, transcoder, 0);
transcoder->Connect(0, layerer, 1);
// Model a simple two-way switch
dmux->SetMask(0x1);
dmux->Synchronize( );     // Data now flows from inputClassifier
                          // through rmon
dmux->SetMask(0x4);
dmux->Synchronize( );     // Data now flows from inputClassifier
```

-continued

```
                          // through the transcoder
// Model a replicator (duplicator)
// This would be the typical use of dmux in the example model
dmux->SetMask(0x7);
dmux->Synchronize( );     // Data now flows from inputClassifier
                          // through rmon, transcoder and layerer
                          // in parallel
```

Gatherer Class

| Name: | Gatherer |
|---|---|
| Specializes: | Stage |
| Qualifiers: | N/A |

Figure 13:
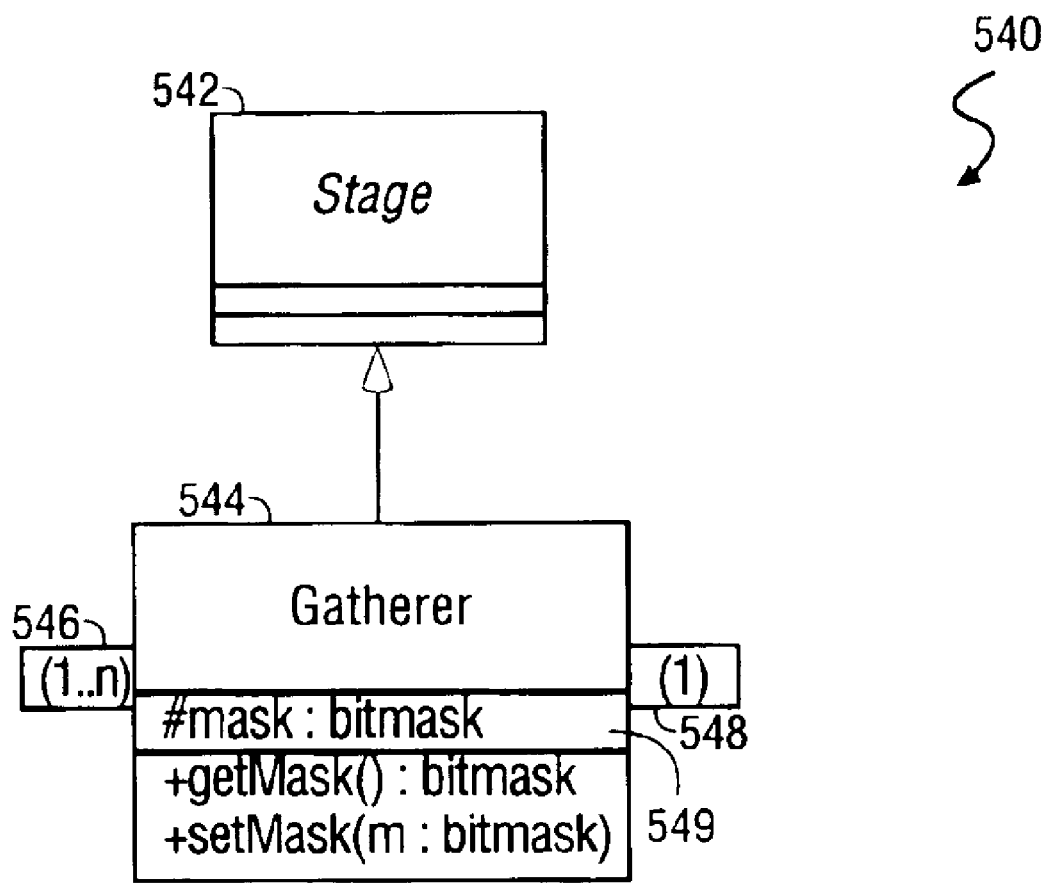
FIG. 13 depicts a block diagram illustrating a gatherer class object in accordance with an embodiment of the present invention.

A Gather class 540, as depicted in FIG. 13, is a subclass of Stage has one output 548 and N inputs 546 (546-1, . . . , 546-N). It operates much like a multiplexor. A Gatherer Stage 544 copies data on any of its enabled inputs 546 to its output 544. The mask-instance variable 549 controls which inputs are considered enabled. The Gatherer represents a simple user-controlled collection point. This might be used to merge a previously scattered data stream back into one steam.

As with Scatterer, no data actually passes through the Gatherer object, which is merely a representation of the underlying hardware.

Stage Parameters

| Parameter | Type | Description |
|---|---|---|
| mask | bitmask | The mask controls which incoming packets (on the input) are copied to the output. |

Methods
The following methods are defined.

| Methods | Services |
|---|---|
| GetMask | Get the current mask value. |
| SetMask | Set the deferred mask value. |

GetMask

Description: bitmask GetMask() const;
Parameters: None
Returns: Current value of the mask.
Exceptions: None.

SetMask

Description: void SetMask(bitmask m);
 Sets the deferred value of the mask
Parameters: IN: bitmask m  The new bitmask to use to determine what outputs are enabled.
 Takes effect after the next Synchronize().
Returns: Nothing.

Example:

```
// The layerer object would be created as follows:
Gatherer *layerer = new Gatherer(2); // 2 = # Inputs
// The Gatherer would be connected to the other Stages
// as follows.
dmux->Connect(1, layerer, 0);
transcoder->Connect(0, layerer, 1);
layerer->Connect(0, outputPort, 0);
// Set the mask to 0x3 to allow packets from either the
// dmux or transcoder to pass through
layerer->SetMask(0x3);
layerer->Synchronize( );
```

Related Types:
See also Scatterer.

SwitchFabric Class

| Name: | SwitchFabric |
|---|---|
| Specializes: | Stage |
| Qualifiers: | N/A |

Figure 14:
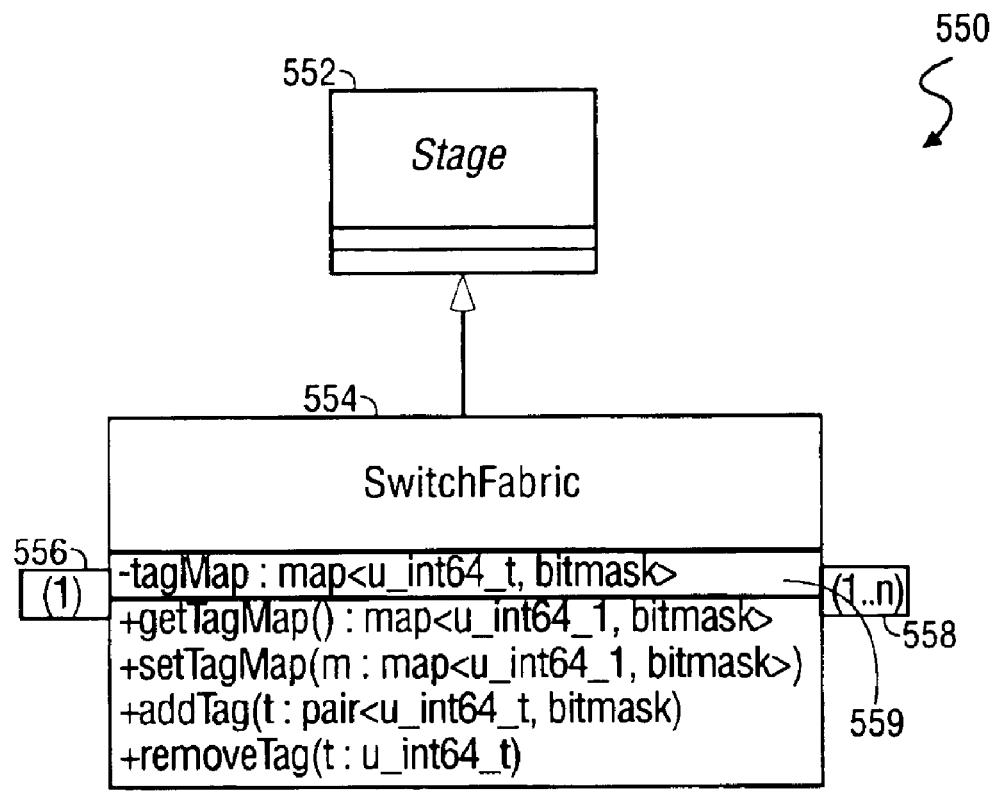
FIG. 14 depicts a block diagram illustrating a switch fabric class object in accordance with an embodiment of the present invention.

A SwitchFabric class 550, as depicted in FIG. 14, is a subclass of Stage 552 and represents a per-packet demultiplexor. A SwitchFabric 554 has one input 556 and N outputs 559 (559-1, . . . , 559-N). A SwitchFabric uses the incoming tag to decide on which outputs 558 (558-1, . . . , 558-N) to forward the packet. A SwitchFabric 554 has a parameter, tagMap 559 that defines the mapping from incoming tags to outputs 558.

Related Types:
See also Classifier

Stage Parameters

| Parameter | Type | Description |
|---|---|---|
| tagMap | map<u_int64_t, bitmask> | Specifies the mapping from incoming tags to outputs. Each bit in the bitmask represents one output. If a bit in the bitmask is set, the incoming data is switched out the corresponding output. |

Methods
The following methods are defined.

| Methods | Services |
|---|---|
| GetTagMap | Get the tag-to-output mapping table. |
| SetTagMap | Sets the deferred value of the mapping table. |
| AddTag | Add an entry to the mapping table. |
| RemoveTag | Remove and entry from the mapping table. |

Other Stage Types

Link Type

| | |
|---|---|
| Name: | Link |
| Specializes: | Stage |
| Qualifiers: | N/A |

Figure 15:
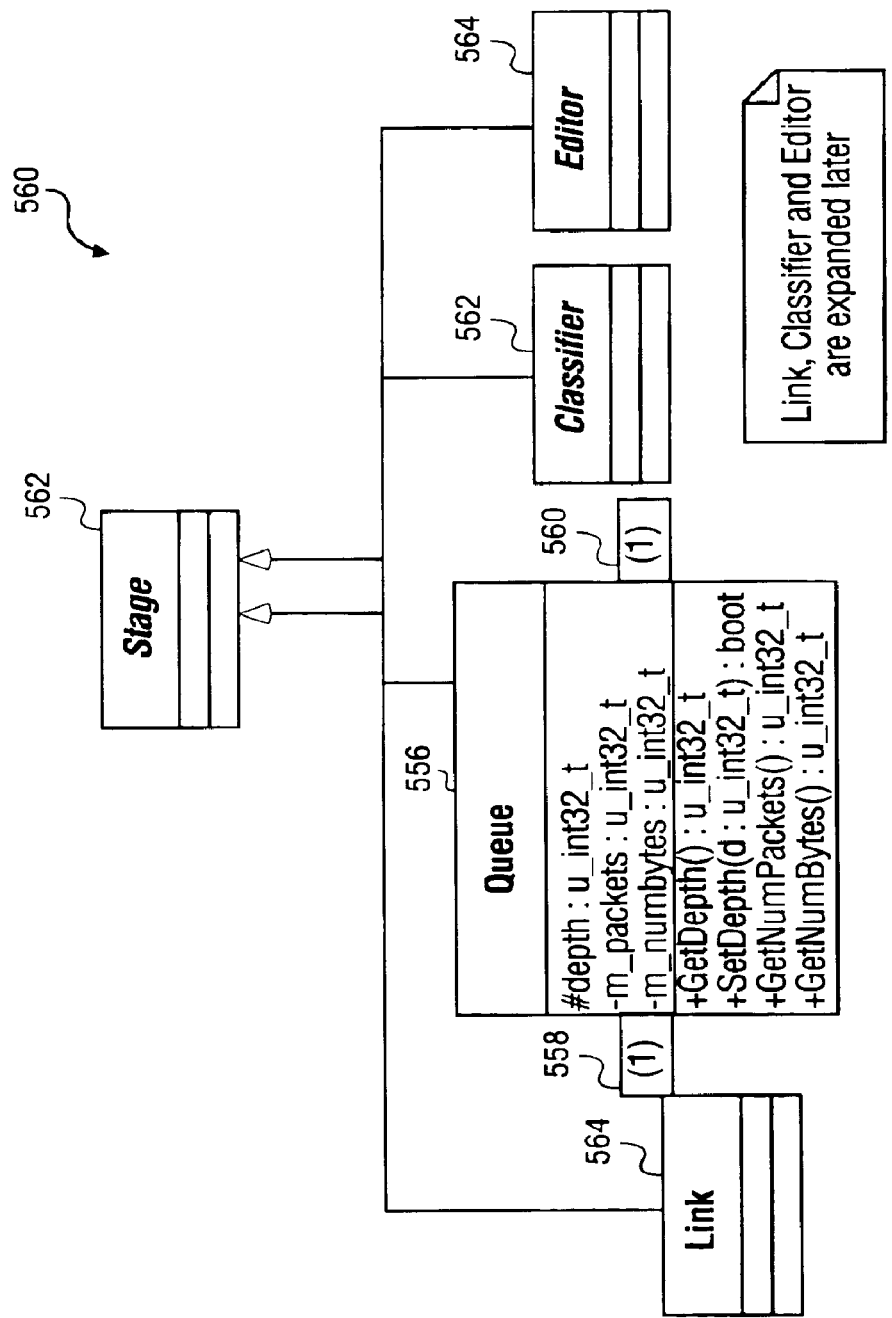
FIG. 15 is a block diagram illustrating additional stage objects in accordance with a further embodiment of the present invention.
Figure 16:
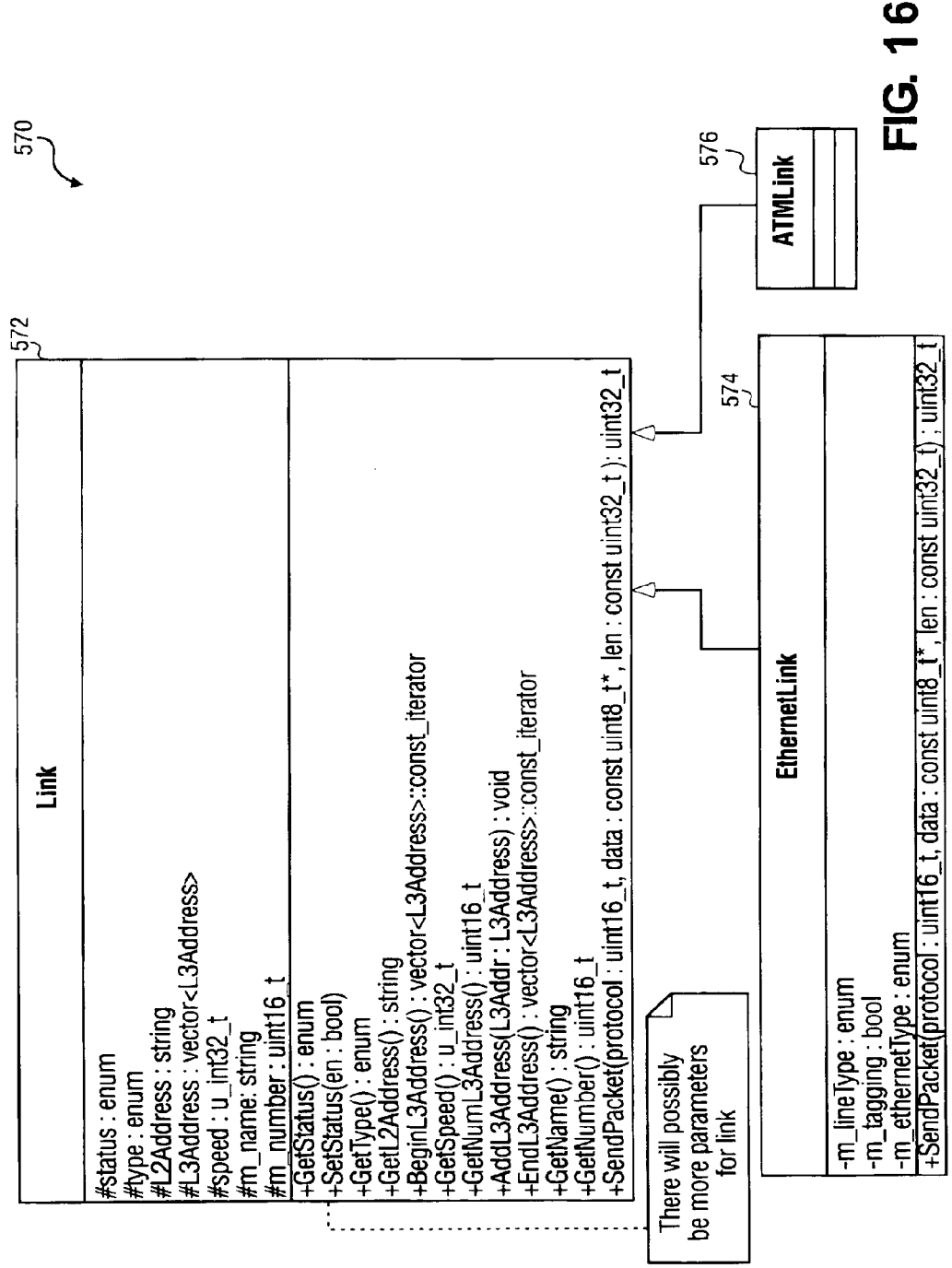
FIG. 16 is a block diagram illustrating a link class object subtype in accordance with a further embodiment of the present invention.

Additional Stage classes 560, are depicted in FIG. 15. A link class 570, as depicted in FIG. 16, represents a physical link. A Link object 572 is intended to be the terminating (beginning or end) Stage 562 of a data-flow topology defined in accordance with the Engine Model. The parameters of a Link are likely candidates for event registration.

Stage Attributes

| Attribute | Type | Description |
|---|---|---|
| m_number | uint16_t | Number of the link |
| m_name | string | Name of the interface eg. eth0 |

GetTagMap

| | |
|---|---|
| Description: | map<u_int64_t, bitmask> GetTagMap( ); |
| | Gets the tag-to-output mapping table. |
| Parameters: | None. |
| Returns: | Returns mapping table. |
| Exceptions: | None. |

SetTagMap

| | | |
|---|---|---|
| Description: | void SetTagMap(map<u_int64_t, bitmask> m); | |
| | Sets the deferred value of the tag-to-output mapping table. | |
| Parameters: | IN: m | The new mapping from incoming tags to bitmasks. The bitmasks indicate on which outputs to forward the incoming data. |
| Returns: | Nothing. | |
| Exceptions: | None. | |

AddTag

| | | |
|---|---|---|
| Description: | void AddTag(pair<u_int64_t, bitmask> t); | |
| | Adds a given entry into the tag-to-output mapping table. | |
| Parameters: | IN: t | The new entry to add into the tagMap. If there is an existing entry with the same tag, the bitmask is replaced with this one |
| Returns: | Nothing | |
| Exceptions: | None. | |

RemoveTag

| | | |
|---|---|---|
| Description: | void RemoveTag(u_int64t) | |
| | throw(item_not_found<string>); | |
| | Remove the designated entry from the tagMap. | |
| Parameters: | IN: u_int64_t t | Tag of the entry to be deleted. |
| Returns: | Nothing. | |
| Exceptions: | If the entry does not exist, item_not_found<string> is raised. | |

Example:

See Ipv4Classifier.

Stage Parameters

| Parameter | Type | Description |
|---|---|---|
| status | enum | Values could be Up, Down, or AdminDown |
| speed | Integer | Kbits/s |
| L2Address | string | The L2 address of the link. A link can have multiple L2address? May need to make this a vector too. |
| L3Address | Vector<L3Address> | The set of L3Addresses for this link. For description of L3Address see Appendix. |
| type | Enum | The type of the Link (e.g., Ethernet, ATM, Frame Relay, etc.) This enum should be consistent with a known standard or at least within ON project. |

Methods

The following Methods are defined.

| Methods | Services |
|---|---|
| GetStatus | Test if Link is operating. |
| SetStatus | Set operating state of Link to UP or AdminDown |
| GetType | Get Link type (e.g., Ethernet, ATM, Frame Relay, etc.) |
| GetL2Address | Get the L2 address of the Link. |
| BeginL3Address | Get the beginning iterator to set of L3 addresses of the Link. |
| EndL3Address | Get the ending iterator to set of L3 addresses of the link |
| GetSpeed | Get the speed of the Link. |
| GetNumL3Address | Get the number of L3 addresses of the link |
| AddL3Address | Adds an L3 address to the Link |
| RemoveL3Address | Removes an L3 address from the link |
| GetName | Get the name of the link |
| GetNumber | Get the number of this link |
| SendPacket | Send the specified packet on this link |

GetStatus

| | |
|---|---|
| Description: | enum GetStatus( ) const;<br>Tests if Link is operational. |
| Parameters: | None. |
| Returns: | Returns Up if Link is operating; Down or AdminDown if not. |
| Exceptions: | None. |

SetStatus

| | | |
|---|---|---|
| Description: | void SetStatus(bool en);<br>Sets the operating state of the Link. | |
| Parameters: | IN: bool en | Set to true if the Link is to be brought up; false if the Link is to be taken down. Only the link class will set the up attribute directly to Down if the link goes down. |
| Returns: | Nothing. | |
| Exceptions: | None. | |

GetType

| | |
|---|---|
| Description: | string GetType( ) const;<br>Gets the Link type (e.g., Ethernet, ATM, Frame Relay, etc.). |
| Parameter: | None. |
| Returns: | Type of the physical Link. |
| Exceptions: | None. |

GetL2Address

| | |
|---|---|
| Description: | string GetL2Address( ) const;<br>Gets the L2 address of the physical Link. |
| Parameters: | None. |
| Returns: | L2 address (string) of the Link. |
| Exceptions: | None. |

BeginL3Address

| | |
|---|---|
| Description: | vector<L3ADDRESS>::const_iterator BeginL3Address( ) const;<br>Gets the beginning iterator to the set of L3 address of the Link. |
| Parameters: | None. |
| Returns: | beginning iterator to the set of L3 address of the Link. |
| Exceptions: | None. |

EndL3Address

| | |
|---|---|
| Description: | vector<L3ADDRESS>::const_iterator EndL3Address( ) const;<br>Gets the ending iterator to the set of L3 address of the Link. |

-continued

| | |
|---|---|
| Parameters: | None. |
| Returns: | ending iterator to the set of L3 address of the Link. |
| Exceptions: | None |

GetSpeed

| | |
|---|---|
| Description: | u_int32_t GetSpeed( ) const;<br>Get the Link speed in Kbits/s |
| Parameters: | None. |
| Returns: | Link speed. |
| Exceptions: | None. |

GetNumL3Address

| | |
|---|---|
| Description: | u_int16_t GetNumL3Address( ) const;<br>Get the Number of L3 addresses on this link. |
| Parameters: | None. |
| Returns: | Um of L3 addresses |
| Exceptions: | None |

AddL3Address

| | |
|---|---|
| Description: | void AddL3Address(L3Address L3Addr) throw<br>(cant_add_L3);<br>Add the given L3Address to the link |
| Parameters: | IN: L3Address L3Addr   L3Address to add |
| Returns: | None |
| Exceptions: | cant_add_L3_exception |

RemoveL3Address

| | |
|---|---|
| Description: | void RemoveL3Address(L3Address L3Addr) throw<br>(item_not_found<string>;<br>Remove the given L3Address to the link |
| Parameters: | IN: L3Address L3Addr   L3Address to remove |
| Returns: | None |
| Exceptions: | item_not_found<string> |

GetName

| | |
|---|---|
| Description: | string GetName( ) const;<br>Get the Name of this link eg. eth0. |
| Parameters: | None. |
| Returns: | Name of link. |
| Exceptions: | None |

GetNumber

| | |
|---|---|
| Description: | string GetNumber( ) const;<br>Get the Number of this link. |
| Parameters: | None. |
| Returns: | Number of the link. |
| Exceptions: | None |

SendPacket

| | |
|---|---|
| Description: | virtual uint32_t SendPacket(uint16_t protocol, const<br>uint8_t* data, const ulnt32_t len )= 0;<br>This is a virtual function which will be defined in the specific link type<br>for a particular Hw/OS and will send the packet out on that link. |
| Parameters: | IN: uint16_t protocol       L3 protocol of the packet to send<br>IN: uint8_t *data        Pointer to packet data to send<br>IN: uint32_t Len       length of the data packet |
| Returns: | uint32_t |
| Exceptions: | None |

Note: To redirect a packet to CE or APP server, we will probably have special links for the purpose.
Note: When a packet is received from a link, the tag will be set to a value identifying the link it arrived on.

Example:

```
// Register a callback to be notified of changes to the
// operational status of a Link.
void callback(string name, Stage *s)
{
    cout << "The Link's " <<name << "Parameter has ";
    cout << "changed state to" << s->GetStatus() << endl;
}
```

-continued

```
CBFunctor<string> cbFunc(NULL, &callback);
EngineGraphManager& egm = EngineGraphManager::getInstance( ) ;
Link 1 = egm.GetLinks( ).begin( );
l.RegisterCB("up", &cbFunc);
// Now any changes to the link state will invoke callback( )
l.SetStatus(false);
l.Synchronize( ); // callback( ) invoked!
```

Note: For link statistics you can now query the monitor object associated with the link.

Link Types

The Link will be further specialized into Ethernet, ATM link etc

| Queue Type | |
|---|---|
| Name: | Queue |
| Specializes: | Stage |
| Qualifiers: | None. |

The Queue class type 556, as depicted in FIG. 15, represents a first-in-first-out store within the forwarding engine hardware. The motivation for having Queues 556 in the Engine Model is to provide a representation of any internal buffering. Right now the capacity is just in bytes.

| Stage Attributes | | |
|---|---|---|
| Attribute | Type | Description |
| M_numbytes | U_int32_t | Number of bytes the queue holds |
| m_packets | u_int32_t | Number of packets the queue holds |

| Stage Parameters | | |
|---|---|---|
| Parameter | Type | Description |
| m_depth | u_int32_t | Number of bytes the queue can hold. |

Methods
The following methods are defined.

| Methods | Services |
|---|---|
| GetDepth | Get the number of bytes the queue can hold. |
| Set Depth | Set the number of bytes the queue can hold. |
| GetNumBytes | Get the number of bytes the queue presently holds |
| GetNumPackets | Get the number of packets the queue holds. |

GetDepth

| Description: | u_int32_t GetDepth () const; |
| | Gets the number of bytes the queue can hold. |
| Parameters: | None. |
| Returns: | Depth of queue. |
| Exceptions: | None. |

SetDepth

| Description: | bool SetDepth (u_int32_t d); |
| | Sets the depth of the queue. |
| Parameters | IN: u_int32_t d | New depth of the queue. |
| Returns: | True if dept set successfully else false. |
| Exceptions: | None. |

GetNumBytes

| Description: | void GetNumBytes (); |
| | Gets the number of bytes in the queue. |
| Parameters | None |
| Returns: | Number of bytes in the queue |
| Exceptions: | None |

GetNumPackets

| Description: | void GetNumPackets (); |
| | Gets the number of packets in the queue. |
| Parameters | None |
| Returns: | Number of packets in the queue |
| Exceptions: | None |
| Example: | |

See Scheduler.

Note:
Now since the monitoring is part of a Stage, the queue could monitor how many packets were received, dropped and transmitted etc.

| Classifier Type | |
|---|---|
| Name: | Classifier |
| Specializes: | SingleIOStage |
| Qualifiers: | Abstract |

Figure 17:
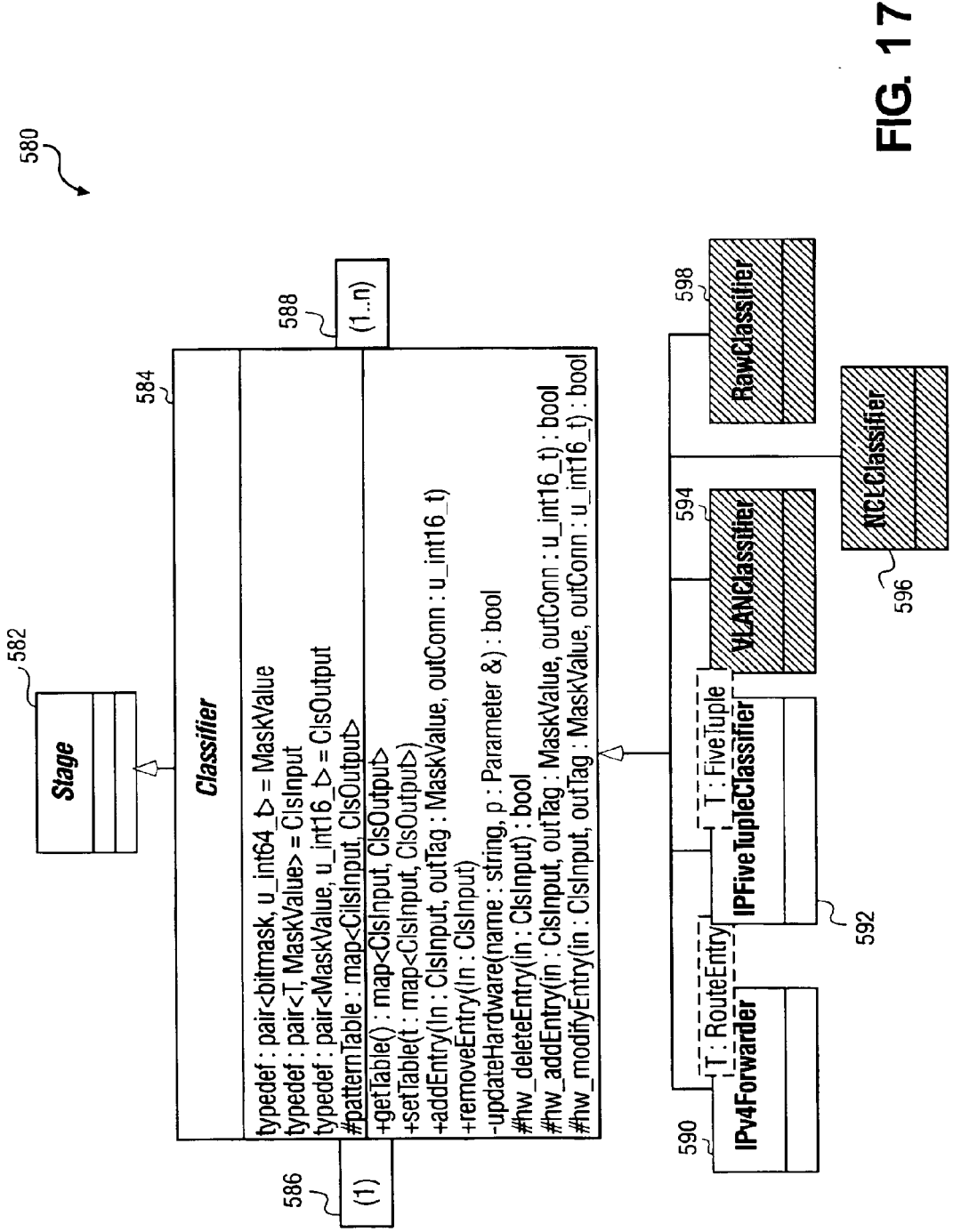
FIG. 17 is a block diagram illustrating classifier class subtypes in accordance with a further embodiment of the present invention.

A Classifier class 580, as depicted in FIGS. 15 and 17, is a Stage with one input 586 and outputs 588 (588-1, . . . , 588-N). A Classifier object 584 represents a Stage that matches packets against a set of patterns (or filters) and then forwards the packet with a specified output tag on a specified output. When a packet, including a tag, arrives on the input 586, a Classifier 584 attempts to match the packet against an ordered list of patterns (the patternTable parameter 589). Once a match is found, the packet is forwarded out the proper output 588 with a modified tag.

The following are characteristics of the Classifier interface:

Inputs and outputs in the Engine Model consist of a tag plus the packet; Classifiers can modify tags.

While patterns are specific to the sub-types of Classifier, patterns contain the input tag. This input tag can be, but does not have to be, used in addition to the pattern for matching purposes. Therefore, one Classifier can use the result of a previous Classifier. See the addEntry method for details.

The output tag from a classifier can be either a combination of the input tag with certain bits modified, or can be completely independent of the input tag. This is determined solely at the discretion of the Engine Model programmer. The implicit requirement is that the output tag has meaning to any downstream Stage that consumes it.

Figure 18:
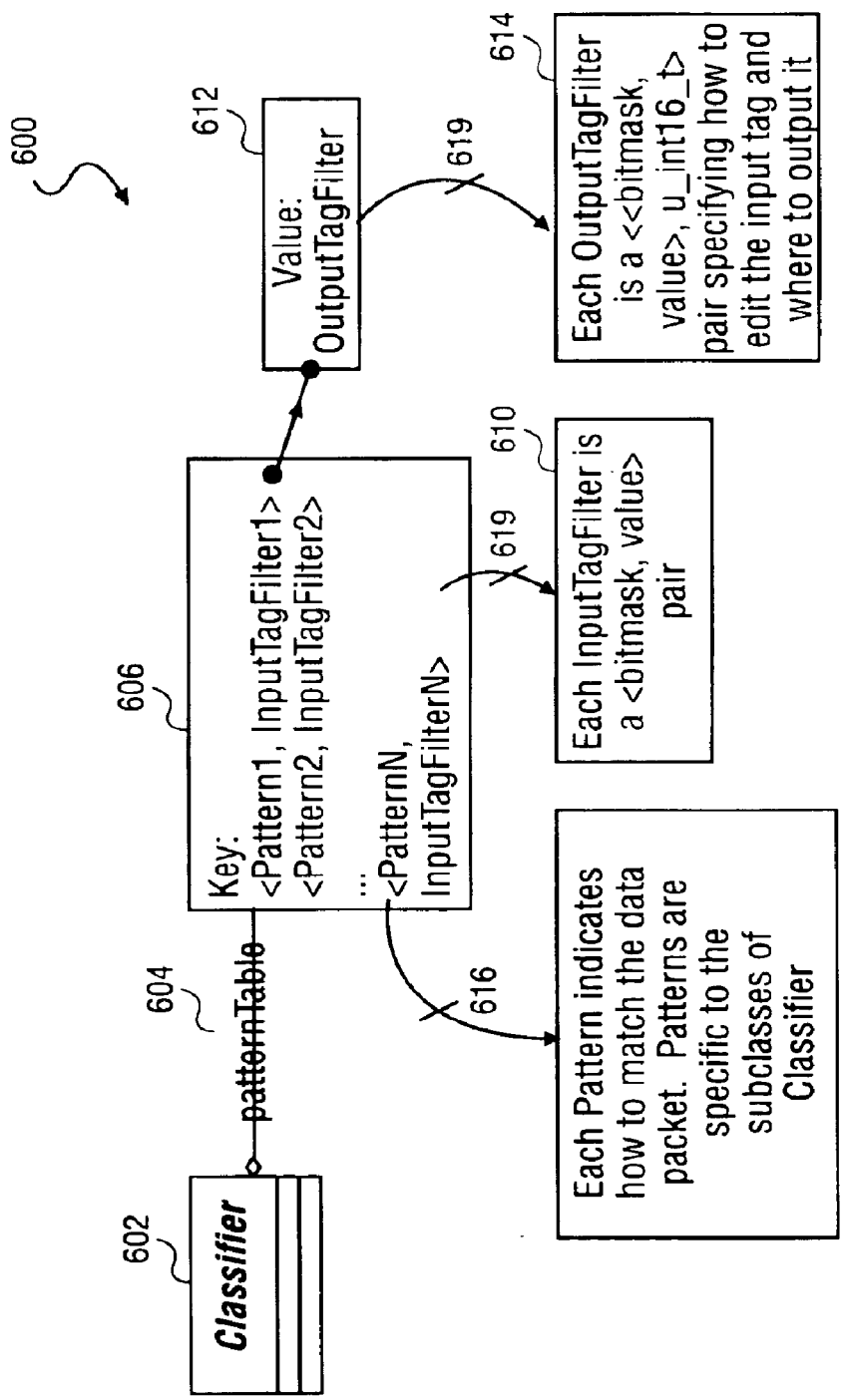
FIG. 18 depicts a block diagram of a classifier pattern table in accordance with a further embodiment of the present invention.

The following pseudo-code illustrates how a Classifier 602 should work, as depicted with reference to FIG. 18:

if ((incoming packet matches pattern) && (incoming tag & inTag.mask)==inTag.value))
then
    outputTag=(incoming tag & ~outTag.mask)|outTag.value;

In this example, the pattern 616, inTag 618, and outTag 619 are specified by each entry in the patternTable 604.

Finally, the abstract Classifier class 602 overrides the UpdateHardware method of the Stage class. This is done so that each specific Classifier implementation does not have to implement UpdateHardware. Rather, Classifier takes over this responsibility and calls three methods: Hw_DeleteEntry( ), Hw_AddEntry( ), and Hw_ModifyEntry( ). Classifier::UpdateHardware( ) calls hw_xxxEntry( ) methods for only those entries in the action table that have changed. This can potentially reduce hardware updates.

Related Types:

typedef u_int64_t bitmask;
typedef pair<bitmask, u_int64_t> MaskValue;
typedef pair<T, MaskValue> ClsInput;
typedef pair<MaskValue, u_int16_t> ClsOutput;

Stage Parameters

| Parameter | Type | Description |
|---|---|---|
| m_patternTable | map<ClsInput, ClsOutput> with ordering | An ordered set of patterns with corresponding output tag modifications. Each entry in this table contains the sub-class specific pattern, the incoming tag pattern, the outgoing tag pattern and the output connection to send the packet for a graphical representation of this data structure. |

Methods

The following methods are defined.

| Methods | Services |
|---|---|
| GetTable | Get the complete pattern table. |
| SetTable | Set (replace) the complete pattern table. |
| AddEntry | Add a new entry to the pattern table. |
| RemoveEntry | Delete an entry from the pattern table. |
| UpdateHardware | Selectively update hardware as required. |
| Hw_DeleteEntry | Delete an entry from the hardware. |
| Hw_AddEntry | Add an entry to the hardware. |
| Hw_ModifyEntry | Replace an existing pattern with a new value. |

GetTable

Description: map<ClsInput, ClsOutput> GetTable () const;
Gets the complete pattern table.
See the description of the patternTable parameter for the format of this table. The type T (which is part of ClsInput) in the table is specified by the concrete subclasses of Classifier.
Parameters: None.
Returns: Complete pattern table.
Exceptions: None.

SetTable

Description: void SetTable(map<clsInput, ClsOutput> t);
Sets (replaces) the pattern table.
Parameters: IN: map t — New pattern table.
Returns: Nothing.
Exceptions: None.

AddEntry

Description: void AddEntry (ClsInput in, MaskValue outTag, u_int16_t outConn);
Add a new entry into the pattern table.
Parameters: IN: ClsInput in entry. This — The key of the new pattern-table key contains both a subclass-specific pattern and an input tag pattern. The input tag pattern is a mask-value pair. See the description of this class for how the input tag pattern is used.
IN:MaskValue outTag — This combined with the outConn is the value of the new pattern-table entry. This is a mask-value pair that is applied to the input tag to produce an output tag. See the description of this class for how this value is used.
IN: u_int16_t outConn — The output connection on which to output the packet with the modified tag. This together with the outTag forms the new value in the pattern table for key in.

-continued

| | |
|---|---|
| Returns: | Nothing. |
| Exceptions: | None. |

RemoveEntry

| | |
|---|---|
| Description: | void RemoveEntry (ClsInput in) throw(item_not_found<string>); Delete an entry from the pattern table. |
| Parameters: | IN: ClsInput in      Key of the entry to delete. |
| Returns: | Nothing. |
| Exceptions: | Throws item_not_found<string> if entry does not exist. |

UpdateHardware

| | |
|---|---|
| Description: | (private) virtual bool UpdateHardware (string name, Parameter& p); This method is overridden from class Stage and is used to make the implementation of specific Classifier types easier. The only value of p for Classifiers is the patternTable. 1. Compares the current value of the patternTable to the deferred value. 2. Calls Hw_DeleteEntry () for each entry found in the current value but not in the deferredValue. 3. Calls Hw_AddEntry () for each entry found in the deferred value and not in the current value. 4. Calls Hw_ModifyEntry for any keys common to both the current and deferred value, but with different values. |
| Parameters: | IN: string name     Name of the Parameter to update. This should always be "patternTable." |
| | IN: Parameter& p     Parameter (patternTable) to be updated. Contains the current value of the hardware (shadow) as well as the deferred (new) value. This method uses these two values to compare the existing table to the new table and calls Hw_XxxEntry () only for differences between the current and deferred tables. |
| Returns: | False if any of the Hw_XxxEntry () calls return false; otherwise true. |
| Exceptions: | None. |

Hw_DeleteEntry

| | |
|---|---|
| Description: | (protected) bool Hw_DeleteEntry (ClsInput in) = 0; Delete the given entry from the hardware. |
| Parameters: | IN: ClsInput in      Entry to delete. |
| Returns: | True if successful, false if not. |
| Exceptions: | None. |

Hw_AddEntry

| | |
|---|---|
| Description: | (protected) bool Hw_AddEntry(ClsInput in, MaskValue out, u_int16_t outConn); Adds the given entry into the hardware. |
| Parameters: | IN:    ClsInput in      The key of the pattern table to add. |
| | IN:    MaskValue out      The mask/value pair specifying how to modify the input tag to produce the output tag. |
| | IN: u_int16_t      The output connection on which to output the packet with the modified tag. |
| Returns: | True if successful; false if not. |
| Exceptions: | None. |

Hw_ModifyEntry

| | |
|---|---|
| Description: | (protected) bool Hw_ModifyEntry (ClsInput in, MaskValue out, u_int16_t outConn); Replaces the existing pattern with the new value. |
| Parameters: | IN: ClsInput in      The existing entry in the pattern table. The value of this entry should be replaced with out. |
| | IN:      MaskValue out   The new mask-value pair to replace the existing entry. |
| | IN: u_int16_t      The output connection on which to output the packet with the modified tag |
| Returns: | True if successful, false if not. |
| Exceptions: | None. |

Example:

```
// Since a Classifier outputs a tag and Editors look at tags
// as input, they will typically be coupled together
Classifier *cls = new Classifier (); // by default a single
I/O classifier
Editor *ed = new Editor ();
// Hook the classifier to the Editor. This would be
// useful for firewalling, NAT, etc.
cls.Connect (0, ed, 0);
// See the subclasses of Classifier for concrete examples
```

IPFiveTupleClassifier

| Name: | IPFiveTupleClassifier |
|---|---|
| Specializes: | Classifier<FiveTuple> |

Qualifiers: None.

An IPFiveTupleClassifier is a specific type of Classifier whose patterns are standard IP five-tuples.

Example:

```
// A 5-tuple classifier could be used for a myriad of
// purposes depending upon the editor or switch fabric it is
// coupled with.
IPFiveTupleClassifier *cls = new IPFiveTupleClassifier ();
// Create a simple pattern table that contains
// two patterns: one to pass HTTP packets, the other
// drop anything
#define PATTERN (x) (x) .first.first
#define IN_TAG_MASK (x) (x) .first.second.first
#define IN_TAG_VALUE (x) (x).first.second.second
#define OUT_TAG_MASK (x) (x).second.first.first
#define OUT_TAG_VALUE (x) (x) .second.first.second
#define OUT_PORT (x) (x).second.second
pair<ClsInput, Output> http, any;
// just a representation
PATTERN (http) = new FiveTuple ("*", "*", "*", 0, 80);
IN_TAG_MASK (http) = 0x0;
IN_TAG_VALUE (http) = 0x0; // Says to ignore the input tag
OUT_TAG_MASK (http) = 0xffffffffffffffff;
OUT_TAG_VALUE (http) = ACCEPT_TAG; // output tag value
OUT_PORT (http) = 0;
PATTERN (any) = new FiveTuple ("*", "*", "*", 0, 0);
IN_TAG_MASK (any) = 0x0;
IN_TAG_VALUE (any) = 0x0; // Say to ignore the input tag
OUT_TAG_MASK (http) = 0x0;
OUT_TAG_VALUE (http) = 0x0; // output tag = input tag
OUT_PORT (http) = 0;
cls.AddEntry (http.first, http.second.first,
http.second.second);
cls.AddEntry (any.first, any.second.first, any.second.second);
```

IPv4Classifier

| Name: | IPv4Classifier |
|---|---|
| Specializes: | Classifier<RouteEntry> |
| Qualifiers: | None. |

The IPv4Classifier is a specific type of Classifier whose filters are routing entries. Such a Classifier is used to perform the lookup phase of IP routing.

Example:

```
// A IPv4 classifier would be used for routing
// 1 input, 4 outputs
IPv4Classifier *rtr = new IPv4Classifier (4);
// Install a route
pair<ClsInput, ClsOutput> e;
PATTERN (e) = new RouteEntry ("1.1.0.0", 0xffff0000,
              "2.2.2.251", "eth3", 10);
OUT_TAG_MASK (e) = 0xffffffffffffffff;
OUT_TAG_VALUE (e) = 4;
OUT_PORT (e) = 4; // 4 = connected to link eth3
rtr.AddEntry (e.first, e.second.first, e.second.second);
```

Editor Type

| Name: | Editor |
|---|---|
| Specializes: | Stage |
| Qualifiers: | Abstract |

Figure 19:
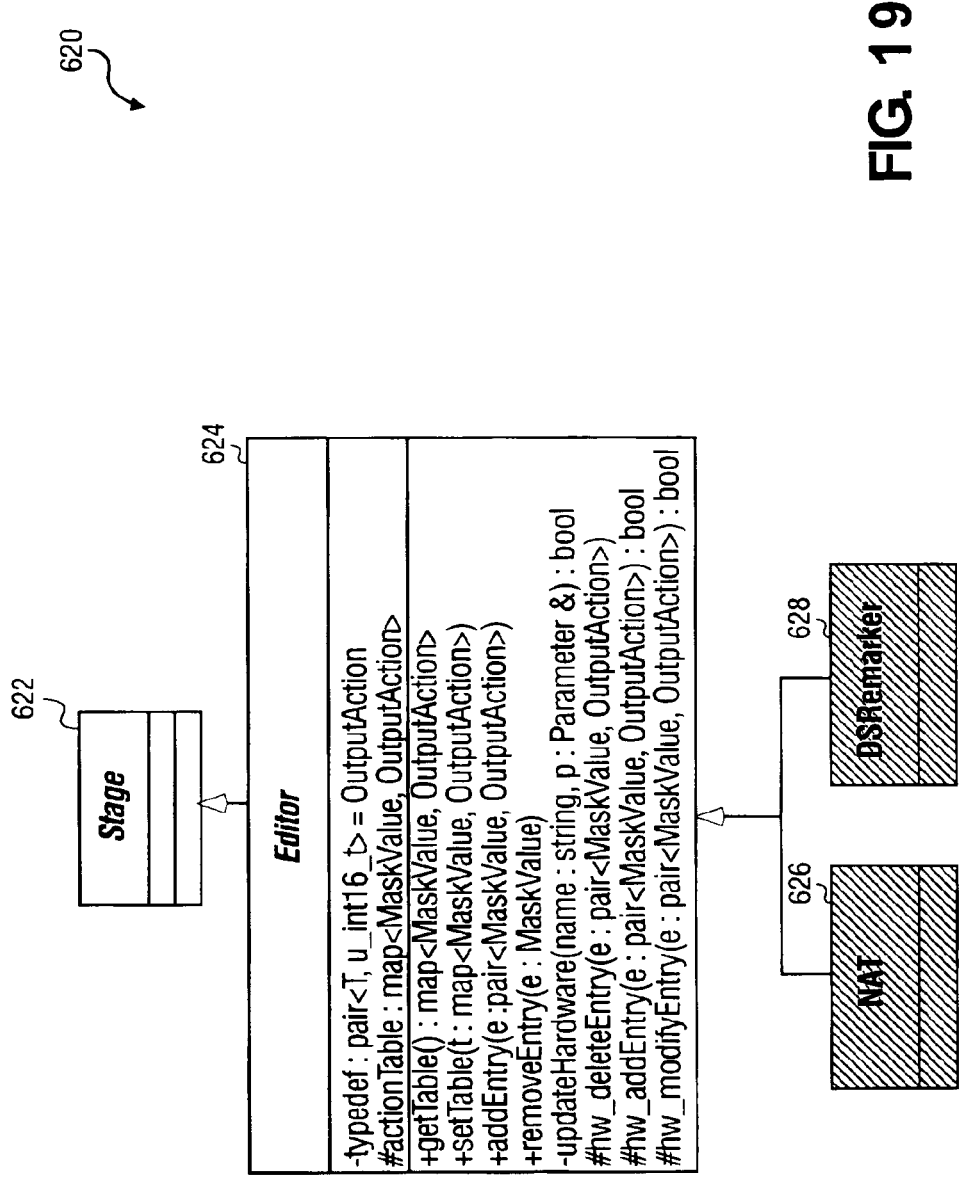
FIG. 19 depicts a block diagram illustrating subtypes of an editor class object in accordance with a further embodiment of the present invention.

An Editor class 620, as depicted in FIGS. 15 and 19, is a Stage 622 that modifies or alters packets passing through it. Editor 624 maintains an action table that is keyed by the tags that come from an upstream Classifer. The Engine Model does not specify the actual value of the tag. The only requirement is that there must be a contract between the upstream Classifier that creates the tags and the downstream Editor Stage. This contract means that the tags sent out by the Classifier are the same as the keys in the Editor's actionTable. For Linux, an editor will always be preceded by a Classifier.

The value in the Editor's action table that corresponds to an incoming tag specifies how to modify the current packet for that tag and on which connection to output. Editors do not modify the outgoing tag. The concrete subclasses of Editor define the format of the action table.

Finally, like Classifier, the abstract Editor class overrides the updateHardware method of the Stage class. This is done for the same reason, and with the same mechanism, as Classifier. See Classifier, Section 0, for details.

Related Types:

typdef pair<T, u_int16_t>=OutputAction//u$_{-1\,int-}$16 is the output port on which to output the packet.

| Stage Parameters | | |
|---|---|---|
| Parameter | Type | Description |
| ActionTable | map<MaskValue, OutputAction> | A collection of key, value pairs. The keys are of the same type as the incoming tags. The values specify how to edit the packet. The actions are specific to the concrete subclasses of Editor. |

Methods
The following methods are defined.

| Methods | Services |
|---|---|
| GetTable | Get complete pattern table. |
| SetTable | Set (replace) pattern table. |
| AddEntry | Add an entry to the pattern table. |
| RemoveEntry | Remove an entry from the pattern table. |

-continued

| Methods | Services |
|---|---|
| UpdateHardware | Selectively update hardware as required. |
| Hw_DeleteEntry | Delete a specified entry from the hardware. |
| Hw_AddEntry | Add an entry to the hardware. |
| Hw_ModifyEntry | Update the entry for a specified tag. |

GetTable

| | |
|---|---|
| Description: | map<MaskValue, OutputAction> GetTable () const; |
| | Get the complete pattern table. The format of each entry (T) is specified by the concrete subclasses of Classifier. |
| Parameters: | None. |
| Returns: | Complete pattern table. |
| Exceptions: | None. |

SetTable

| | | |
|---|---|---|
| Description: | void SetTable (map<Maskvalue, OutputAction> t); | |
| | Set (replace) the pattern table. | |
| Parameters: | IN: map t | New pattern table. |
| Returns: | Nothing. | |
| Exceptions: | None. | |

AddEntry

| | | |
|---|---|---|
| Description: | void AddEntry (pair<MaskValue, OutputAction> e); | |
| | Adds a new entry into the pattern table. | |
| Parameters: | IN: pair e | Entry to add into the pattern table. |
| Returns: | Nothing. | |
| Exceptions: | None. | |

RemoveEntry

| | | |
|---|---|---|
| Description: | void RemoveEntry (pair<Maskvalue, OutputAction> e) throw (item_not_found<string>); | |
| | Delete an entry from the pattern table. | |
| Parameters: | IN: pair e | Entry to delete from pattern table. |
| Returns: | Nothing. | |
| Exceptions: | Throws item_not_found<string> if entry does not exist. | |

UpdateHardware

| | | |
|---|---|---|
| Description: | (private) virtual bool UpdateHardware (string name, Parameter& p); | |
| | This method is overridden from class Stage and is used to make the implementation of specific Editor types easier. The only value of p for an Editor is the actionTable. | |
| | 1. Compare the current value of the actionTable to the deferred value. | |
| | 2. Call Hw_DeleteEntry () for each entry found in the current value but not in the deferred value. | |
| | 3. Call Hw_AddEntry () for each entry found in the deferred value but not in the current value. | |
| | 4. Calls Hw_ModifyEntry () for any keys common to both the current and deferred values, but with different action values. | |
| Parameters: | IN: string name | The string representing the name of the Parameter to update. Should always be "actionTable" |
| | IN: Parameter& p | The parameter (actionTable) to be updated. This parameter contains the current value of the hardware (shadow) as well as the deferred (new) value. This method uses these two values to compare the existing table to the new table and only calls hw_xxxEntry () for differences between the current and deferred tables. |
| Returns: | False if any of the Hw_XxxEntry calls return false; otherwise true. | |
| Exceptions: | None. | |

Hw_DeleteEntry

| | |
|---|---|
| Description: | (protected) bool Hw_DeleteEntry (pair<MaskValue, OutputAction> e) = 0; |
| | Delete the given entry from the hardware. |

|  |  |  |  |
|---|---|---|---|
| Parameters: | IN: :pair<MaskValue, OutputAction> delete. | | Entry to |
| Returns: | Returns true if successful, false if not. | | |
| Exceptions: | None. | | |
| Hw_AddEntry | | | |
| Description: | (protected) bool Hw_AddEntry (pair<MaskValue, OutputAction> e); Add the given entry into the hardware. | | |
| Parameters: | IN: :pair<MaskValue, OutputAction> Entry to add. | | |
| Returns: | True if successful, false if not. | | |
| Exceptions: | None. | | |
| Hw_ModifyEntry | | | |
| Description: | (protected) bool Hw_ModifyEntry (pair<MaskValue, OutputAction> e); Update the value (OutputAction) for the given tag (MaskValue) in the hardware. | | |
| Parameters: | IN: pair<MaskValue, OutputAction> modify. | | Entry to |
| Returns: | True if successful, false if not. | | |
| Exceptions: | None. | | |

Note:
Some examples of specific editors include ones used for redirecting traffic to CE or App server.

Example:

See Classifier.

| Scheduler | |
|---|---|
| Name: | Scheduler |
| Specializes: | Stage |
| Qualifiers: | Abstract |

Figure 20:
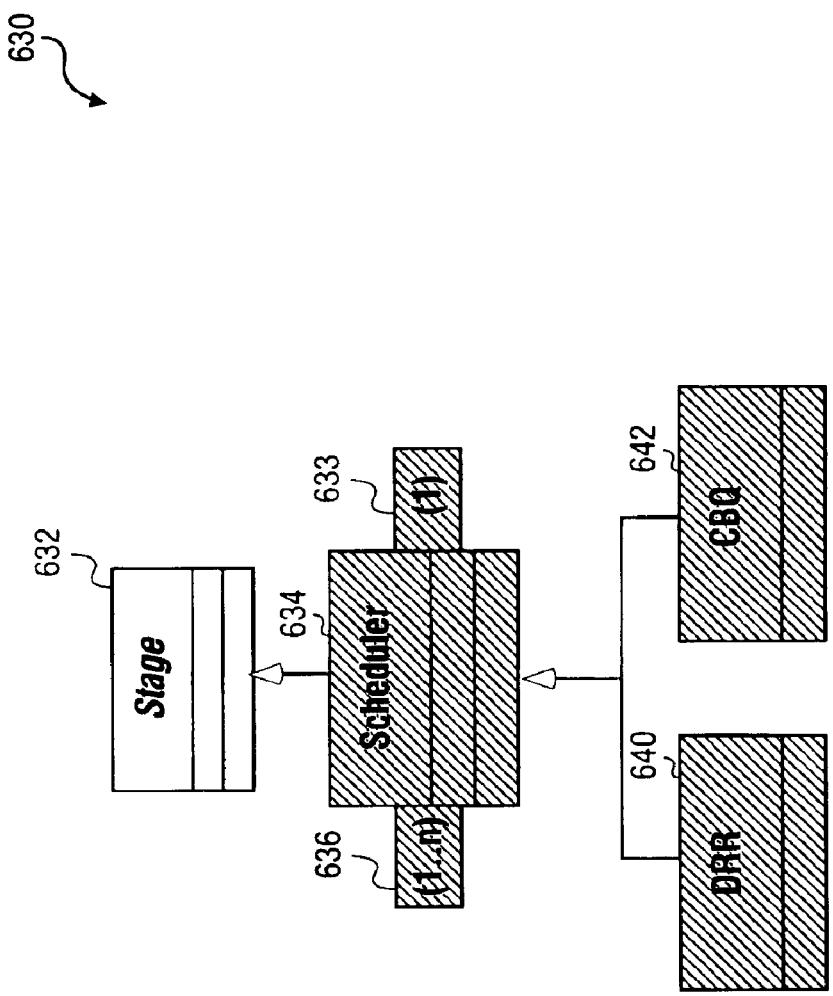
FIG. 20 depicts a block diagram illustrating subtypes of a scheduler class object in accordance with the further embodiment of the present invention.

A Scheduler class 630, as depicted in FIGS. 15 and 20, represents a Stage 632 that services (dequeues) packets from several input queues 636 (636-1, . . . , 636-N) and copies them to one output 638. The concrete sub-classes of Scheduler (640, 642) specify additional parameters to control the policy behind this scheduling.

Example:

```
// A Scheduler would typically be used at either input
// or output. In this case, we build a Scheduler
// to provide two traffic classes on an output link
Link& 1 = *(LinksContainer: :begin () );
Scheduler *sch = new Scheduler (2);   // two input queues
Queue    *q1 = new Queue (200),   // packet depth
         *q2 = new Queue (500);
q1.Connect (0, sch, 0);
q2.Connect (0, sch, 1);
sch.Connect (0, 1, 0);
// Now add a classifier to place packets
// into the queues
// here it is abstract for demonstration purpose, have a
spcific instance //here
Classifier *cls = new Classifier (2);   // 2 outputs
cls.Connect (0, q1, 0);
cls.Connect (1, q2, 0);
// Now depending upon the classifier (which is not
// specified in this example) and the scheduling policy
// of the Scheduler (also not shown), the output link
// will output packets based on the two queues.
```

| Logger Stage | |
|---|---|
| Name: | Logger |
| Specializes: | None |
| Qualifiers: | None |

This is a concrete Stage that is empty, essentially a null Stage. It only holds on to a monitoring object, so can be used as a logging Stage. A logger can have either 0 or 1 outputs. If it has 0 outputs it passively monitors the packets in parallel with possibly other operations. If it has one output, it outputs the packet without modification on that output.

| Monitoring Types | |
|---|---|
| Monitor | |
| Name: | Monitor |
| Specializes: | None |
| Qualifiers: | None. |

Figure 21:
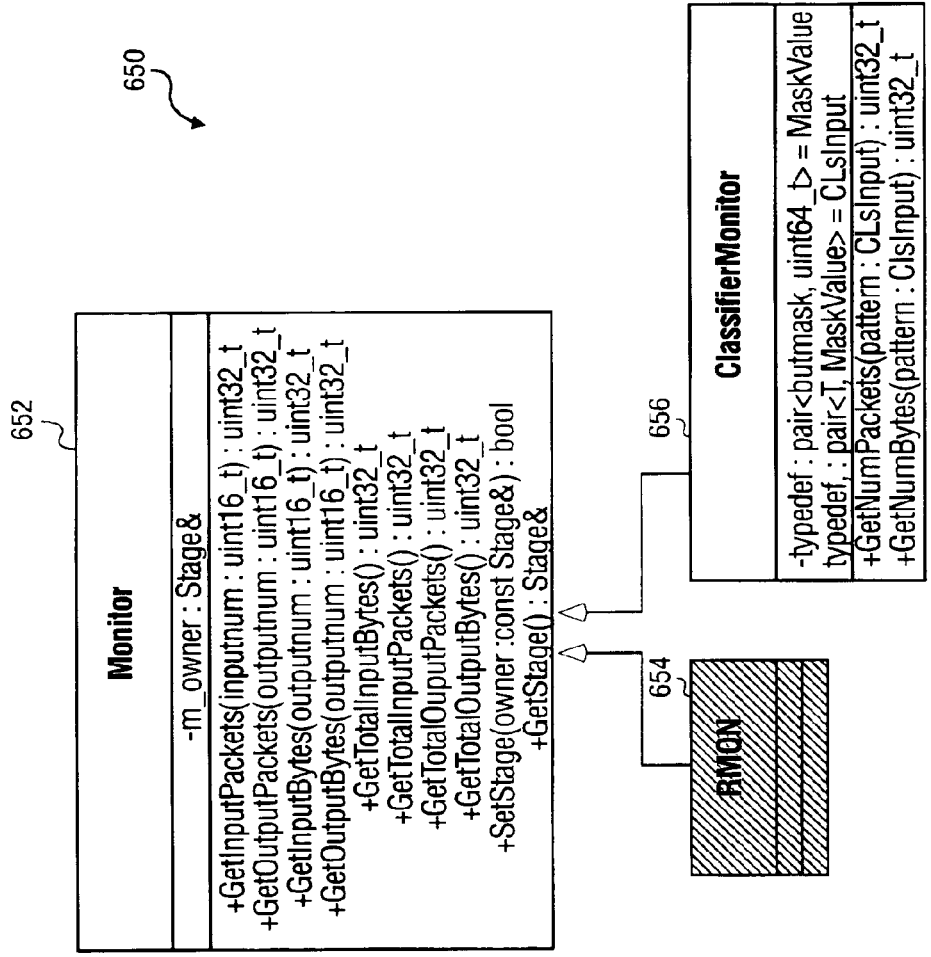
FIG. 21 depicts a block diagram illustrating subtypes of a monitor class object in accordance with the further embodiment of the present invention.

The monitor class 650, as depicted in FIG. 21, allows a user to gather statistics (e.g., packet counts) for each input and output of the Stage that's owns it. There may be sub-types like RMON 654 and ClassifierMonitor 656.

| Attributes | | |
|---|---|---|
| Attribute | Type | Description |
| m_owner | Stage& | A reference to the Stage that holds this monitor |

Methods
The following methods are defined.

| Methods | Services |
| --- | --- |
| GetInputBytes | Gets the number of bytes arriving on the given input. |
| GetInputPackets | Gets the number of packets arriving on the given input |
| GetOutputBytes | Gets the number of bytes leaving the given output |
| GetOutputPackets | Get the number of packets leaving the given output |
| GetTotalInputPackets | Total packets arriving in the Stage |
| GetTotalInputBytes | Total bytes arriving in the Stage |
| GetTotalOutputPackets | Total packets leaving the Stage |
| GetTotalOutputBytes | Total bytes leaving the Stage |

GetInputBytes/GetInputPackets

| | |
| --- | --- |
| Description: | uint32_t GetInputBytes (uint16_t input) const;<br>Uint32_t GetInputPackets (uint16_t input) const;<br>Gets the bytes(packets) arriving on a particular input of the owner Stage. |
| Parameters: | IN: uint16_t Input for which number of bytes(packets) required. |
| Returns: | Number of bytes(packets) on the given input of owner Stage. |
| Exceptions: | None. |

GetOutputBytes/GetOutputpackets

| | |
| --- | --- |
| Description: | uint32_t GetOutputBytes (uint16_t output) const;<br>Uint32_t GetOutputpackets (uint16_t output) const;<br>Gets the bytes(packets) leaving on a particular output of the owner Stage. |
| Parameters: | IN: uint16_t output for which number of bytes(packets) required. |
| Returns: | Number of bytes(packets) on the given output of owner Stage. |
| Exceptions: | None. |

GetTotalInputBytes/GetTotalInputPackets

| | |
| --- | --- |
| Description: | uint32_t GetTotalInputBytes () const;<br>Uint32_t GetTotalInputpackets () const;<br>Gets the total bytes(packets) arriving at the owner Stage. |
| Parameters: | None. |
| Returns: | Number of bytes(packets) arriving at the owner Stage. |
| Exceptions: | None. |

GetTotalOutputBytes/GetTotalOutputPackets

| | |
| --- | --- |
| Description: | uint32_t GetTotalOutputBytes () const;<br>Uint32_t GetTotalOutputPackets () const;<br>Gets the total bytes(packets) leaving the owner Stage. |
| Parameters: | None. |
| Returns: | Number of bytes(packets) leaving the owner Stage. |
| Exceptions: | None |

Examples:
A monitor held by a link can be queried for packets/bytes received and transmitted.
A monitor held by a Queue can be used to query packets received, as well as packets pulled from the queue, and this can be used to calculate the number of packets dropped.

| ClassifierMonitor | |
| --- | --- |
| Name: | ClassifierMonitor |
| Specializes: | Monitor |
| Qualifiers: | Abstract. |

A ClassifierMonitor class 656, as depicted in FIG. 21, is an abstract class in a sense similar to the Classifier Stage. Specific types such as FiveTupleClassifierMonitor will specify the pattern, and hence the ClsInput for which the statistics is required.

(Or since the map in classifier is ordered, we could have just a patternid/position as input, and get statistics for it; this would be more generic, but with less intuition about what the pattern actually is.)

Related Types:
typedef pair<bitmask, uint64_t> Mask Value
typedef pair<T, MaskValue> ClsInput // T is specified by specific types of classifiermonitors.

Attributes

Methods

The following methods are defined.

| Methods | Services |
| --- | --- |
| GetNumBytes | Gets the number of bytes matching a given pattern. |
| GetNumPackets | Gets the number of packets matching a given pattern |

| | GetNumBytes/GetNumPackets |
|---|---|
| Description: | uint32_t GetNumBytes (clsInput pattern) const;<br>Uint32_t GetNumPackets (ClsInput pattern) const;<br>Gets the bytes(packets) matching the pattern in owner Stage. |
| Parameters: | IN: ClsInput Pattern for which number of bytes(packets) required. |
| Returns: | Number of bytes(packets) matching the given pattern of owner Stage. |
| Exceptions: | no_such_pattern |

Composition of Stages

Figure 22:
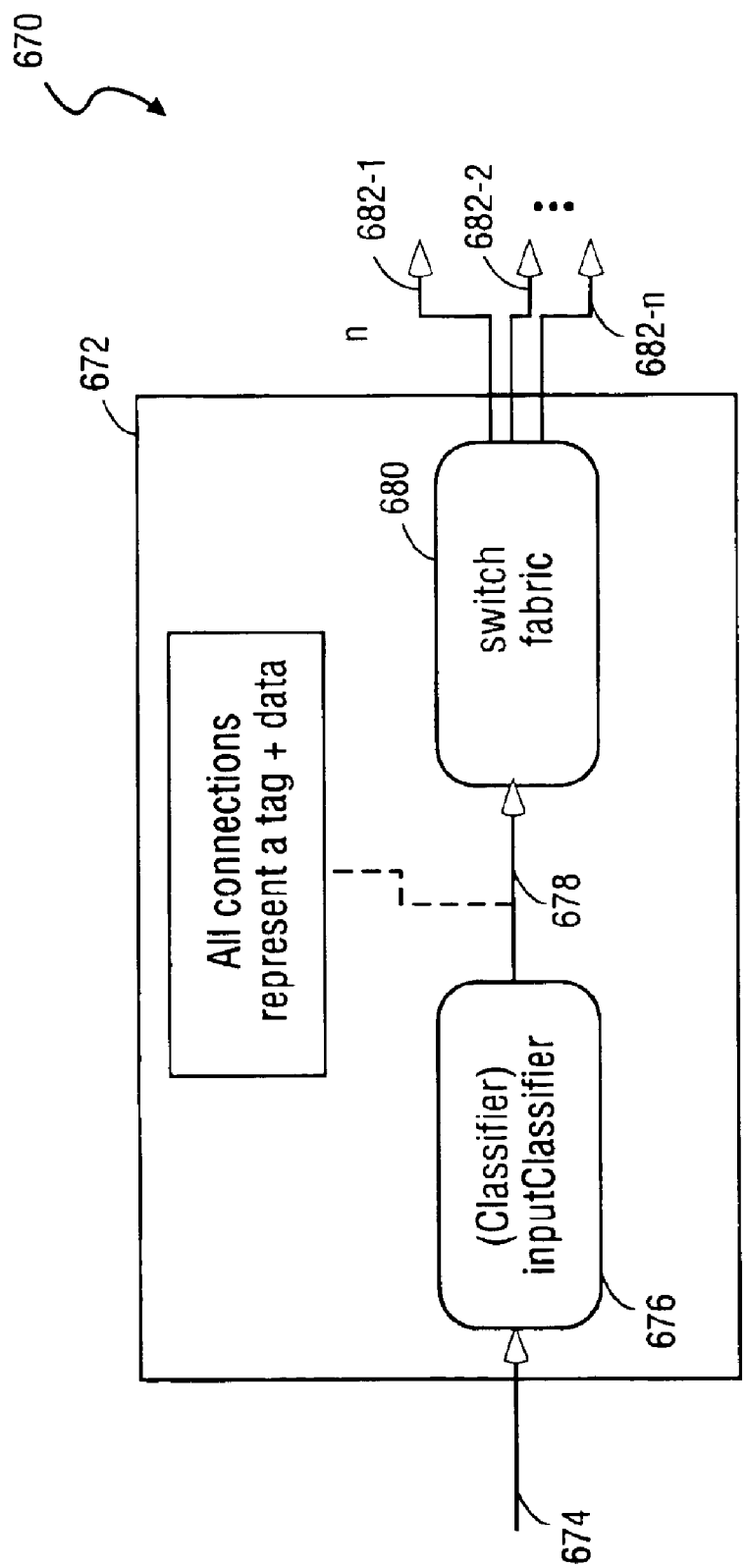
FIG. 22 is a block diagram illustrating a classifier class object composed together with a switch fabric class object in accordance with a further embodiment of the present invention.
Figure 23:
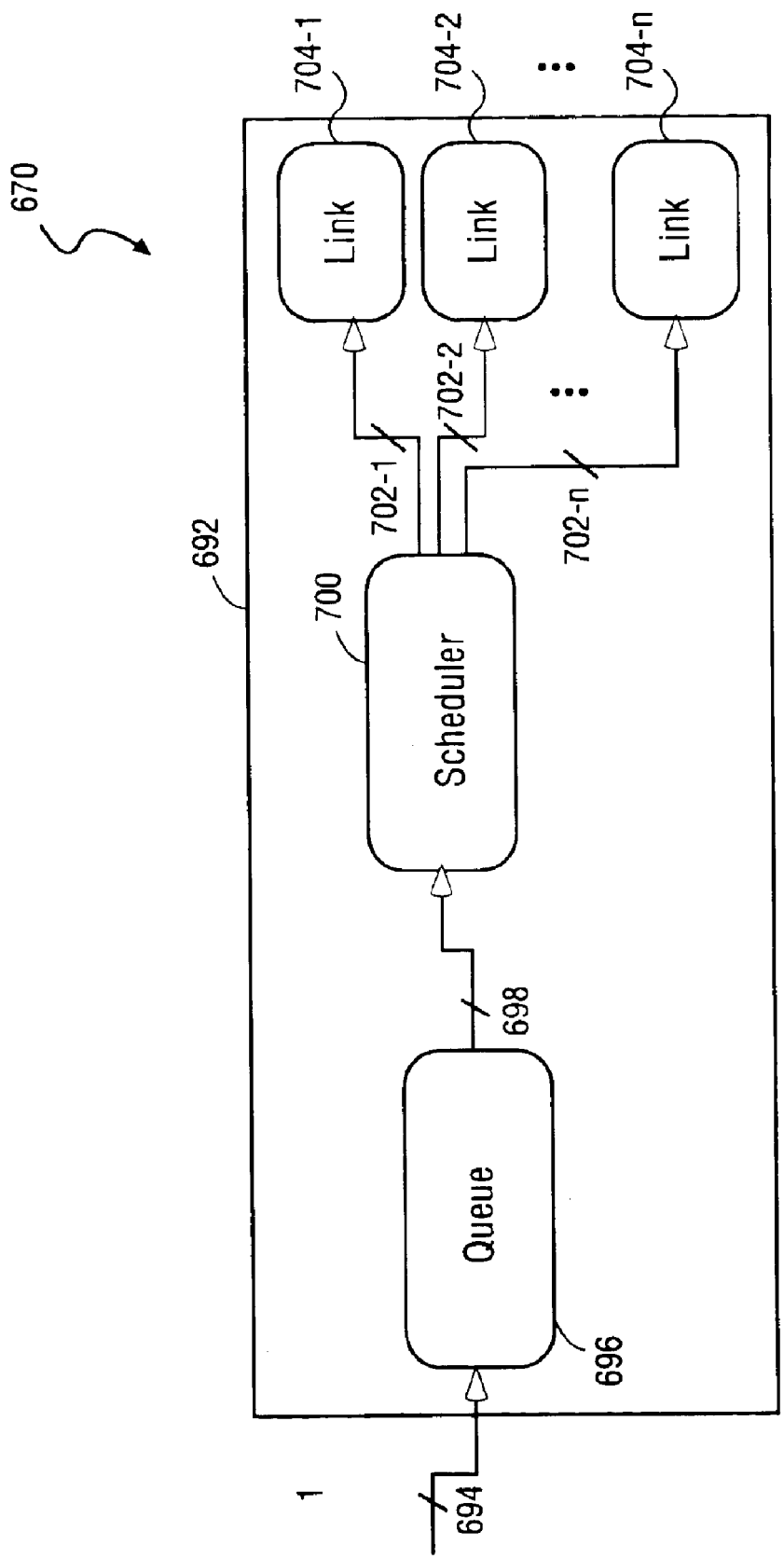
FIG. 23 depicts a block diagram illustrating a composition of stages for performing link aggregation in accordance with a further embodiment of the present invention.

Individual Stages can be combined to form more complex Stages, as depicted in FIGS. 22 and 23, and be treated as a single entity at compile time by defining new classes. At the same time meta-Stages can be formed at run time that behave as a single unit (in terms of being there as a whole or not being there at all) by using the mutable property of the connections.

Classifier with a Switchfabric

A classifier 676 with a switch fabric 680 is described with reference to FIG. 22. A classifier outputs packets 678 on one of the outputs. However at times we may need the packet to take multiple paths based on the classification (ie. multicast Ipv4Classifier). This can be easily accomplished by a MultiClassifier 670 formed by combining a Classifier 676 (with one output) with a switchfabric 680 (and optionally a monitor in between). The classifier outputs the packet 678 with the tag on its output and the switchfabric 680 sends the packet on one or more of its output 682 (682-1, . . . , 682-N) based on the tag output by the classifier.

MultiClassifier

A multiclassifier 690, as described with reference to FIG. 23, can be defined at runtime as follows.

Link Aggregation

We can use composition of Stages to represent link aggregation too. Thus an output aggregate link 704 (704-1, . . . , 704-n) can be represented as depicted in FIG. 23. The other approach for link aggregation would be to use the composite design pattern. This would allow us to present the same interface for single as well as aggregate links. This would mean adding methods in Link class for adding/deleting links. Users then would always access links through the Link Interface, which could contain single or multiple Ethernet (or possibly other) links. It would internally contain the scheduler if it had more than one physical link.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of class structure and management of objects to form directed graphs of data/packet flow within the principles of the present invention to the full extent indicated by the broad general meaning of the terms in which the appended claims are expressed. For example, the particular API forwarding engine and underlying forwarding engine hardware may vary depending on the particular application for the novel object abstraction and identical API model while maintaining substantially the same functionality without departing from the scope and spirit of the present invention.

In addition, although an embodiment described herein is directed to a Forwarding Engine API, it will be appreciated by those skilled in the art that the teaching of the present invention can be applied to other systems. In fact, systems for network processing including ASICs as well as network process programmed using an API model as described herein are within the teachings of the present invention, without departing from the scope and spirit of the present invention.

The present invention provides many advantages over known techniques. The present invention provides a unified software programming model that is expressive enough to represent both fixed-function hardware as well as programmable network processors. This invention is a large step up from the register-level programming models offered by current ASICs because it is a state-of-the-art object-oriented programming model. This invention is a unifying technology for current network processors that are typically in their infancy in terms of programming model. A key advantage of this approach for network processors is that it does not sacrifice performance by actually executing the packet-processing in software, rather it abstracts the capabilities of the network processor but does not emulate them. In either case, this invention benefits both ISVs by providing a high-level programming model that does not sacrifice performance and the silicon vendors themselves, by providing an API that can grow with the evolution of their hardware while not alienating their ISV partners.

Having disclosed exemplary embodiments, modifications and variations may be made to the disclosed embodiments while remaining within the scope of the invention as defined by the following claims.

What is claimed is:

1. A method comprising:
    selecting one or more software stage objects from an object-oriented programming model wherein the software stage objects encapsulate and represent functionality performed by underlying hardware to process a packet, the software stage objects including:
        one or more link stage objects to define a physical interface and packet framing,
        one or more classifier stage objects to direct filtering and matching algorithms on packets,
        one or more packet flow stage objects to direct packet flow policy,
        a scatter stage object to direct packet routing to scatterer object outputs,
        a gather stage object to direct packet collecting and routing scattered packets,
        an editor stage object to direct packet modification, and
        a monitor stage object to direct gathering of statistical information regarding packets and packet flows;
    programming the one or more selected software stage objects to perform a desired packet processing functionality; and
    connecting the one or more programmed software stage objects to form a directed graph of packet flow to complete definition of the desired packet processing functionality, such that underlying hardware is directed to process packets in accordance with the desired packet processing functionality.

2. The method of claim 1, wherein the connecting the one or more programmed software objects further comprises:
selecting an input link stage object as an input port of the directed graph to direct a physical interface and packet framing;
selecting a classifier stage object coupled to the input link stage object to direct filtering and matching algorithms on packets;
selecting a scatter stage object coupled to the classifer stage object to direct routing of packets to one or more scatter stage object outputs;
selecting a monitor stage object coupled to an output from the one or more scatter stage object outputs to direct gathering of statistical information regarding packets and packet flows;
selecting an editor stage object coupled to an output from the one or more scatter object outputs to direct packet modification;
selecting a gather stage object coupled to an output from the one or more scatter object outputs to direct packet routing to a gather stage object output; and
selecting an output link stage object as an output port of the directed graph, the output link stage object coupled to the gather stage object output.

3. The method of claim 1, wherein the directing underlying hardware further comprises:
relaying requests from the programmed software stage objects contained in the directed graph to underlying packet forwarding hardware in accordance with the desired packet processing functionality; and
processing packets by the packet forwarding hardware in response to the software stage object requests, such that the directed graph of programmed stage software objects control packet data flow through the packet forwarding hardware.

4. The method of claim 1, wherein the one or more software stage objects each include one or more inputs and one or more outputs enabling formation of compositions of objects sharing a common interface to direct packet processing as a group of software stage objects and to form directed graphs of software stage objects to direct packet data flow through packet forwarding hardware.

5. The method of claim 1, further comprising:
loading underlying hardware with the directed graph of programmed software stage objects to process packets in accordance with the desired packet processing functionality.

6. The method of claim 3:
wherein each software stage object within the directed graph performs a data-path packet processing task functionality, such that the directed graph of programmed software stage objects performs a plurality of data-path packet processing tasks within a single device.

7. A machine-readable medium having stored thereon data representing sequences of instructions, the sequences of instructions which, when executed by a processor, cause the processor to performing a method comprising:
directing underlying hardware loaded with a directed graph of programmed software stage objects to process packets in a manner specified using an object-oriented model and compiled to produce the directed graph of programmed software stage objects, wherein the software stage objects encapsulate and represent functionality performed by underlying hardware to process a packet, the software stage objects including:
one or more link stage objects to define a physical interface and packet framing,
one or more classifier stage objects to direct filtering and matching algorithms on packets,
one or more packet flow stage objects to direct packet flow policy,
a scatter stage object to direct packet routing to scatterer object outputs,
a gather stage object to direct packet collecting and routing scattered packets,
an editor stage object to direct packet modification; and
a monitor stage object to direct gathering of statistical information regarding packets and packet flows.

8. The machine-readable medium of claim 7, wherein the directing underlying hardware further comprises:
relaying requests from the software stage objects contained in the directed graph to underlying packet forwarding hardware in accordance with a desired packet processing functionality; and
performing packet processing by the packet forwarding hardware in response to the software stage object requests, such that the directed graph of programmed software stage objects control packet data flow through the packet forwarding hardware.

9. The machine readable medium of claim 7,
wherein each software stage object within the directed graph performs a data-path packet processing task functionality, such that the directed graph of programmed software stage objects performs a plurality of data-path packet processing tasks within a single device.

10. An apparatus, comprising:
a processor; and
a memory coupled to the processor, the memory to load a directed graph of programmed software stage objects to direct the processor to process packets in a manner specified using an object-oriented model and compiled to produce the directed graph of programmed software stage objects, wherein the software stage objects encapsulate and represent functionality performed by underlying hardware to process a packet, the software stage objects including:
one or more link stage objects to define a physical interface and packet framing,
one or more classifier stage objects to direct filtering and matching algorithms on packets,
one or more packet flow stage objects to direct packet flow policy,
a scatter stage object to direct packet routing to scatterer object outputs,
a gather stage object to direct packet collecting and routing scattered packets,
an editor stage object to direct packet modification, and
a monitor stage object to direct gathering of statistical information regarding packets and packet flows.

11. The apparatus of claim 10, wherein the memory is further to relay requests from the software stage objects contained in the directed graph to the processor, such that processor processes packets in response to the software stage object requests to control packet data flow through the processor.

12. The apparatus of claim 10, wherein the processor comprises a network processor.

13. The apparatus of claim 10, wherein the processor comprises an application specific integrated circuit.

14. A system comprising:
    a wide area network;
    a local area network; and
    a processor coupled between the wide area network and the local area network on to form a network, the processor having
    a memory coupled to the processor, the memory to load a directed graph of programmed software stage objects to direct the processor to process packets in a manner specified using an object-oriented model and compiled to produced the directed graph of programmed software stage objects wherein the software stage objects encapsulate and represent functionality performed by underlying hardware to process a packet, the software stage objects including:
        one or more link stage objects to define a physical interface and packet framing,
        one or more classifier stage objects to direct filtering and matching algorithms on packets,
        one or more packet flow stage objects to direct packet flow policy,
        a scatter stage object to direct packet routing to scatterer object outputs,
        a gather stage object to direct packet collecting and routing scattered packets,
        an editor stage object to direct packet modification, and
        a monitor stage object to direct gathering of statistical information regarding packets and packet flows.

15. The system of claim 14, wherein the memory is further configured to relay requests from the software stage objects contained in the directed graph to the processor, such that processor process packets in response to the software stage object requests for controlling packet data flow through the processor.

16. The system of claim 14, wherein the processor comprises a network processor.

17. The system of claim 14, wherein the processor comprises an application specific integrated circuit.

18. The system of claim 14, wherein each software stage object within the directed graph performs a data-path packet processing task functionality, such that the directed graph of programmed software stage objects performs a plurality of data-path packet processing tasks within a single device.

19. A method comprising:
    directing underlying hardware loaded with a directed graph of programmed software stage objects to process packets in a manner specified using an object-oriented model and compiled to produce the directed graph of programmed software stage objects wherein the software stage objects encapsulate and represent functionality performed by underlying hardware to process a packet, the software stage objects including:
        one or more link stage objects to define a physical interface and packet framing,
        one or more classifier stage objects to direct filtering and matching algorithms on packets,
        one or more packet flow stage objects to direct packet flow policy,
        a scatter stage object to direct packet routing to scatterer object outputs,
        a gather stage object to direct packet collecting and routing scattered packets,
        an editor stage object to direct packet modification, and
        a monitor stage object to direct gathering of statistical information regarding packets and packet flows.

20. The method of claim 19, wherein the directing underlying hardware further comprises:
    relaying requests from the programmed software stage objects contained in the directed graph to underlying packet forwarding hardware in accordance with the desired packet processing functionality; and
    processing packets by the packet forwarding hardware in response to the software stage object requests, such that the directed graph of programmed software stage objects control packet data flow through the packet forwarding hardware.

21. The method of claim 20, wherein each software stage object within the directed graph performs a data-path packet processing task functionality, such that the directed graph of programmed software objects performs a plurality of data-path packet processing tasks within a single device.

* * * * *